(12) United States Patent
Srinivasagopalan et al.

(10) Patent No.: US 10,984,104 B2
(45) Date of Patent: Apr. 20, 2021

(54) MALWARE CLUSTERING BASED ON ANALYSIS OF EXECUTION-BEHAVIOR REPORTS

(71) Applicant: AlienVault, Inc., San Mateo, CA (US)

(72) Inventors: Srivathsan Srinivasagopalan, Austin, TX (US); Alex Lisle, Austin, TX (US); Russell Spitler, Austin, TX (US); Roger Thornton, Austin, TX (US)

(73) Assignee: AlienVault, Inc., San Mateo, CA (US)

( * ) Notice: Subject to any disclaimer, the term of this patent is extended or adjusted under 35 U.S.C. 154(b) by 43 days.

(21) Appl. No.: 16/114,877

(22) Filed: Aug. 28, 2018

(65) Prior Publication Data
US 2020/0074081 A1 Mar. 5, 2020

(51) Int. Cl.
*G06F 21/56* (2013.01)
*G06F 21/55* (2013.01)
*G06K 9/62* (2006.01)

(52) U.S. Cl.
CPC .......... *G06F 21/566* (2013.01); *G06F 21/552* (2013.01); *G06K 9/6215* (2013.01); *G06K 9/6218* (2013.01)

(58) Field of Classification Search
CPC ... G06F 21/566; G06F 21/552; G06K 9/6215; G06K 9/6218
See application file for complete search history.

(56) References Cited

U.S. PATENT DOCUMENTS

| | | | |
|---|---|---|---|
| 9,165,142 B1 * | 10/2015 | Sanders | G06F 21/566 |
| 9,489,516 B1 * | 11/2016 | Lu | G06F 21/53 |
| 9,525,702 B2 | 12/2016 | Cabot et al. | |
| 10,230,749 B1 | 3/2019 | Rostami-Hesarsorkh et al. | |
| 10,437,996 B1 * | 10/2019 | Li | G06F 16/285 |

(Continued)

OTHER PUBLICATIONS

Sourav Dutta, et al., "Neighbor-Aware Search for Approximate Labeled Graph Matching using the Chi-Square Statistics," 2017 International World Wide Web Conference Committee, pp. 1281-1290.

(Continued)

*Primary Examiner* — Mohammed Waliullah
(74) *Attorney, Agent, or Firm* — Hartman & Citrin LLC

(57) ABSTRACT

Techniques are disclosed relating to malware clustering based on execution-behavior reports. In some embodiments, a computer system may access malware information that includes a plurality of reports corresponding to a plurality of malware samples. In some embodiments, each of the malware reports specifies a set of features relating to execution behavior of a corresponding malware sample. The computer system may, in various embodiments, process the plurality of reports to generate a plurality of vectors that includes, for each of the malware samples, a corresponding vector indicative of the execution behavior of the corresponding malware sample. Based on the plurality of vectors, the computer system may generate similarity values indicative of a similarity between ones of the plurality of vectors. Further, based on the similarity values, the computer system may assign each of the plurality of malware samples to one of a plurality of clusters of related malware samples.

19 Claims, 18 Drawing Sheets

(56) References Cited

U.S. PATENT DOCUMENTS

| | | | | |
|---|---|---|---|---|
| 2009/0013405 A1* | 1/2009 | Schipka | ............... | G06F 21/562 |
| | | | | 726/22 |
| 2016/0006749 A1* | 1/2016 | Cohen | .................. | G06F 16/285 |
| | | | | 726/23 |
| 2016/0306971 A1 | 10/2016 | Anderson et al. | | |
| 2018/0144131 A1 | 5/2018 | Wojnowicz et al. | | |

OTHER PUBLICATIONS

Sun Hao, et al., "AutoMal: automatic clustering and signature generation for malwares based on the network flow," Security Comm. Networks 2015; 8; published online May 29, 2014 in Wiley Online Library (wileyonlinelibrary.com).DOI: 10.1002/sec.1029, pp. 1845-1854.

Shanhu Shang, et al., "Detecting Malware Variants via Function-call Graph Similarity," 2010 5th International Conference on Malicious and Unwanted Software, Oct. 19-20, 2010, pp. 113-120.

Ciprian Oprisa, et al., "Locality-Sensitive Hashing Optimizations for Fast Malware Clustering," 2014 IEEE 10th International Conference on Intelligent Computer Communication and Processing (ICCP), Sep. 4-6, 2014, pp. 97-104.

Zhang Fuyong, et al., "Malware Detection and Classification Based on n-grams Attribute Similarity," 2017 IEEE International Conference on Computational Science and Engineering (CSE) and IEEE International Conference on Embedded and Ubiquitous Computing (EUC), pp. 793-796.

Jeffrey Dean, et al., "MapReduce: Simplifed Data Processing on Large Clusters," Google, Inc., To appear in OSDI 2004, 13 pages.

Xin Hu, et al., "MutantX-S: Scalable Malware Clustering Based on Static Features," 2013 USENIX Annual Technical Conference, Jun. 26-28, 2013, 13 pages.

Neha Runwal, et al., "Opcode graph similarity and metamorphic detection," J Comput Virol (2012) 8; Accepted: Mar. 19, 2012 / Published online: Apr. 3, 2012, © Springer-Verlag France 2012, pp. 37-52.

Jure Leskovec, et al. "Mining of Massive Datasets," Stanford Univ., Copyright 2010, 2011, 2012, 2013, 2014, 513 pages.

Kinable et al., "Malware Classification Based on Call Graph Clustering," Aalto University, Department of Information and Computer Science, Aug. 27, 2010 (Year: 2010).

U.S. Office Action dated Aug. 19, 2020 in U.S. Appl. No. 16/115,012.

* cited by examiner

*Internal Behavioral Features 310*

```
" behavior ": {
        " created_services ": [],
        " delete_files ": [
                "C :\\ Documents and Settings \\ Mike \\ rdhF218 .tmp. bat"
        ],
        " delete_keys ": [
                " HKEY_CURRENT_USER \\ Software \\ Microsoft \\ Windows \\ CurrentVersion \\ Internet Settings \\ ProxyServer ",
                " HKEY_CURRENT_USER \\ Software \\ Microsoft \\ Windows \\ CurrentVersion \\ Internet Settings \\ ProxyOverride ",
                " HKEY_CURRENT_USER \\ Software \\ Microsoft \\ Windows \\ CurrentVersion \\ Internet Settings \\ AutoConfigURL "
        ],
        " read_files ": [
                "\\??\\ PIPE \\ srvsvc ",
                "\\??\\ PIPE \\ wkssvc ",
                "C :\\ Documents and Settings \\ All Users \\ Application Data \\7 ecdb4a7 . exe ",
                "C :\\ Documents and Settings \\ Mike \\ rdhF218 .tmp. bat"
        ],
        " read_keys ": [
                " HKEY_CURRENT_USER \\ Software \\ Microsoft \\ Windows \\2 d17e659 ",
                " HKEY_CURRENT_USER \\ Software \\ Microsoft \\ Windows \\ CurrentVersion \\ Explorer \\ User Shell Folders \\
AppData ",
                " HKEY_LOCAL_MACHINE \\ SOFTWARE \\ Microsoft \\ Windows NT \\ CurrentVersion \\ ProfileList \\
ProfilesDirectory ",
                " HKEY_LOCAL_MACHINE \\ SOFTWARE \\ Microsoft \\ Windows NT \\ CurrentVersion \\ ProfileList \\
AllUsersProfile ",
                " HKEY_LOCAL_MACHINE \\ SOFTWARE \\ Microsoft \\ Windows NT \\ CurrentVersion \\ ProfileList \\
DefaultUserProfile ",
                " HKEY_LOCAL_MACHINE \\ SOFTWARE \\ Microsoft \\ Windows \\ CurrentVersion \\ ProgramFilesDir ",
                " HKEY_LOCAL_MACHINE \\ SOFTWARE \\ Microsoft \\ Windows \\ CurrentVersion \\ CommonFilesDir "
        ],
        " write_keys ": [
                " HKEY_CURRENT_USER \\ Software \\ Microsoft \\ Windows \\4334 c972 ",
                " HKEY_CURRENT_USER \\ Software \\ Microsoft \\ Windows \\2 d17e659 ",
                " HKEY_CURRENT_USER \\ Software \\ Microsoft \\ Windows \\ CurrentVersion \\ Run \\ IntelPowerAgent3 "
        ],
        " write_files ": [
                "C :\\ Documents and Settings \\ All Users \\ Application Data \\7 ecdb4a7 . exe ",
                "C :\\ Documents and Settings \\ Mike \\ rdhF218 .tmp. bat",
                "\\??\\ PIPE \\ lsarpc ",
                "C :\\ Documents and Settings \\ Mike \\ Local Settings \\ Temporary Internet Files \\ Content . IE5 \\ index . dat ",
                "C :\\ Documents and Settings \\ Mike \\ Cookies \\ index . dat ",
                "C :\\ Documents and Settings \\ Mike \\ Local Settings \\ History \\ History . IE5 \\ index .dat"
```

FIG. 3B

```
"behavior": {                           External Behavioral Features 312
    "network": {
        "dns": [
            {
                "answers": [
                    {
                        "data": "",
                        "type": "NXDOMAIN"
                    }
                ],
                "request": "adtejoyo1377.tk",
                "type": "A"
            },
            {
                "answers": [
                    {
                        "data": "2.21.246.10",
                        "type": "A"
                    },
                    {
                        "data": "2-01-3 cf7-0009.cdx.cedexis.net",
                        "type": "CNAME"
                    },
                    {
                        "data": "download.windowsupdate.com.edgesuite.net",
                        "type": "CNAME"
                    },
                ],
                "request": "download.windowsupdate.com",
                "type": "A"
            }
        ],
        "domains": [
            {
                "domain": "download.windowsupdate.com",
                "ip": "13.107.4.50"
            },
        ],
        "hosts": [
            {
                "country_name": "unknown",
                "hostname": "",
                "inaddrarpa": "static.253.218.46.78.clients.your-server.de.",
                "ip": "78.46.218.253"
            },
            {
                "country_name": "unknown",
                "hostname": "download.windowsupdate.com",
                "inaddrarpa": "",
                "ip": "2.21.246.10"
            }
        ],
        "http": [],
        "icmp": [],
        "irc": [],
        "pcap_sha256": "942782e162bd2049ec083057c251b5b0ed23c9ed55c2fe715dbd4e37038c01a0",
        "smtp": [],
        "sorted_pcap_sha256": "b0eb499b026efb66471ea0bb0c88b8a79ce2da25f4a1af05d443eb3f6684adc0",
        "tcp": [],
        "udp": [
            {
                "dport": 137,
                "dst": "192.168.56.255",
                "offset": 936,
                "sport": 137,
                "src": "192.168.56.104",
                "time": -2.2131869792938232
            },
            {
                "dport": 138,
                "dst": "192.168.56.255",
                "offset": 11988,
                "sport": 138,
                "src": "192.168.56.104",
                "time": -2.213650941848755
            }
        ]
```

```
┌─────────────────────────────────────────────────────────┐
│ Process the plurality of reports to generate a plurality │
│ of vectors that includes, for each of the malware        │
│ samples, a corresponding vector indicative of the        │
│ execution behavior of the corresponding malware sample   │
│                          704                             │
└─────────────────────────────────────────────────────────┘
                              │
                              ▼
┌─────────────────────────────────────────────────────────┐
│ Based on the malware information, generate a            │
│ plurality of data shingles that includes, for each of the│
│ plurality of reports, a respective set of data shingles │
│                          852                             │
└─────────────────────────────────────────────────────────┘
                              │
                              ▼
┌─────────────────────────────────────────────────────────┐
│ Generate a plurality of hash values based on the        │
│ plurality of data shingles, where the plurality of hash │
│ values include, for each of the plurality of reports, a │
│ corresponding hash value that is based on a             │
│ respective set of data shingles                         │
│                          854                             │
└─────────────────────────────────────────────────────────┘
                              │
                              ▼
┌─────────────────────────────────────────────────────────┐
│ Encode the plurality of hash values to generate the     │
│ plurality of vectors                                    │
│                          856                             │
└─────────────────────────────────────────────────────────┘
```

```
┌─────────────────────────────────────────────────────────────────────┐
│ Maintain malware information corresponding to a plurality of malware │
│ samples, where, for each of the plurality of malware samples, the    │
│ malware information includes:                                        │
│                                                                      │
│ A string specifying a function call graph for a corresponding        │
│ malware sample; and                                                  │
│                                                                      │
│ A set of statistical properties associated with the corresponding    │
│ malware sample                                                       │
│                              1402                                    │
└─────────────────────────────────────────────────────────────────────┘
                                   │
                                   ▼
┌─────────────────────────────────────────────────────────────────────┐
│     Receive information corresponding to a particular malware sample │
│                              1404                                    │
└─────────────────────────────────────────────────────────────────────┘
                                   │
                                   ▼
┌─────────────────────────────────────────────────────────────────────┐
│ Based on the information, generate:                                  │
│                                                                      │
│ A particular string specifying a function call graph for the         │
│ particular malware sample; and                                       │
│                                                                      │
│ A particular set of statistical properties associated with the       │
│ particular malware sample                                            │
│                              1406                                    │
└─────────────────────────────────────────────────────────────────────┘
                                   │
                                   ▼
┌─────────────────────────────────────────────────────────────────────┐
│ Execute a query against the malware information to retrieve malware  │
│ samples similar to the particular malware sample, where the query    │
│ specifies one or more of the particular set of statistical properties│
│                              1408                                    │
└─────────────────────────────────────────────────────────────────────┘
                                   │
                                   ▼
┌─────────────────────────────────────────────────────────────────────┐
│ Based on the query, identify a subset of malware samples, of the     │
│ plurality of malware samples, that match the particular malware      │
│ sample                                                               │
│                              1410                                    │
└─────────────────────────────────────────────────────────────────────┘
                                   │
                                   ▼
┌─────────────────────────────────────────────────────────────────────┐
│ Assign the particular malware sample and the subset of malware       │
│ samples into one of a plurality of clusters of related malware       │
│ samples                                                              │
│                              1412                                    │
└─────────────────────────────────────────────────────────────────────┘
```

MALWARE CLUSTERING BASED ON ANALYSIS OF EXECUTION-BEHAVIOR REPORTS

BACKGROUND

Technical Field

This disclosure relates generally to data security, and more particularly to malware clustering.

Description of the Related Art

The proliferation of malware has become a major threat to many computer systems. Such software is often used to disable, disrupt, monitor, or otherwise interfere with the computing operations performed by targeted computer systems. Currently, there are approximately 400,000 new malware varieties registered each day, making it difficult for vendors of anti-malware software to detect attacks and release updates in sufficient time to prevent infection and propagation of malware. Many new varieties of malware are modifications and variations on existing, known malware varieties. For example, a malicious user may take an existing malware sample and modify one or more aspects of its behavior, such as its obfuscation techniques, to create a new malware variety. Due to these modifications, such a new malware variety may be more difficult to detect and identify.

BRIEF DESCRIPTION OF THE DRAWINGS

FIGS. 3B and 3C provide examples of internal behavioral features and external behavioral features, respectively.

FIGS. 8A and 8B are flow diagrams illustrating example methods for processing a plurality of reports to generate a plurality of vectors, according to some embodiments.

FIG. 14 is a flow diagram illustrating an example method for determining identifying information for a malware sample, according to some embodiments.

DETAILED DESCRIPTION

Grouping malware into clusters may be useful for various reasons. For example, once a population of malware samples has been clustered, useful insights may be determined from each of the clusters, such as the identification of the salient features of a cluster, determining the lineage among members of the cluster, and the derivation of one or more signatures operable to detect all, or a substantial percentage, of the members of the cluster.

Figure 1:
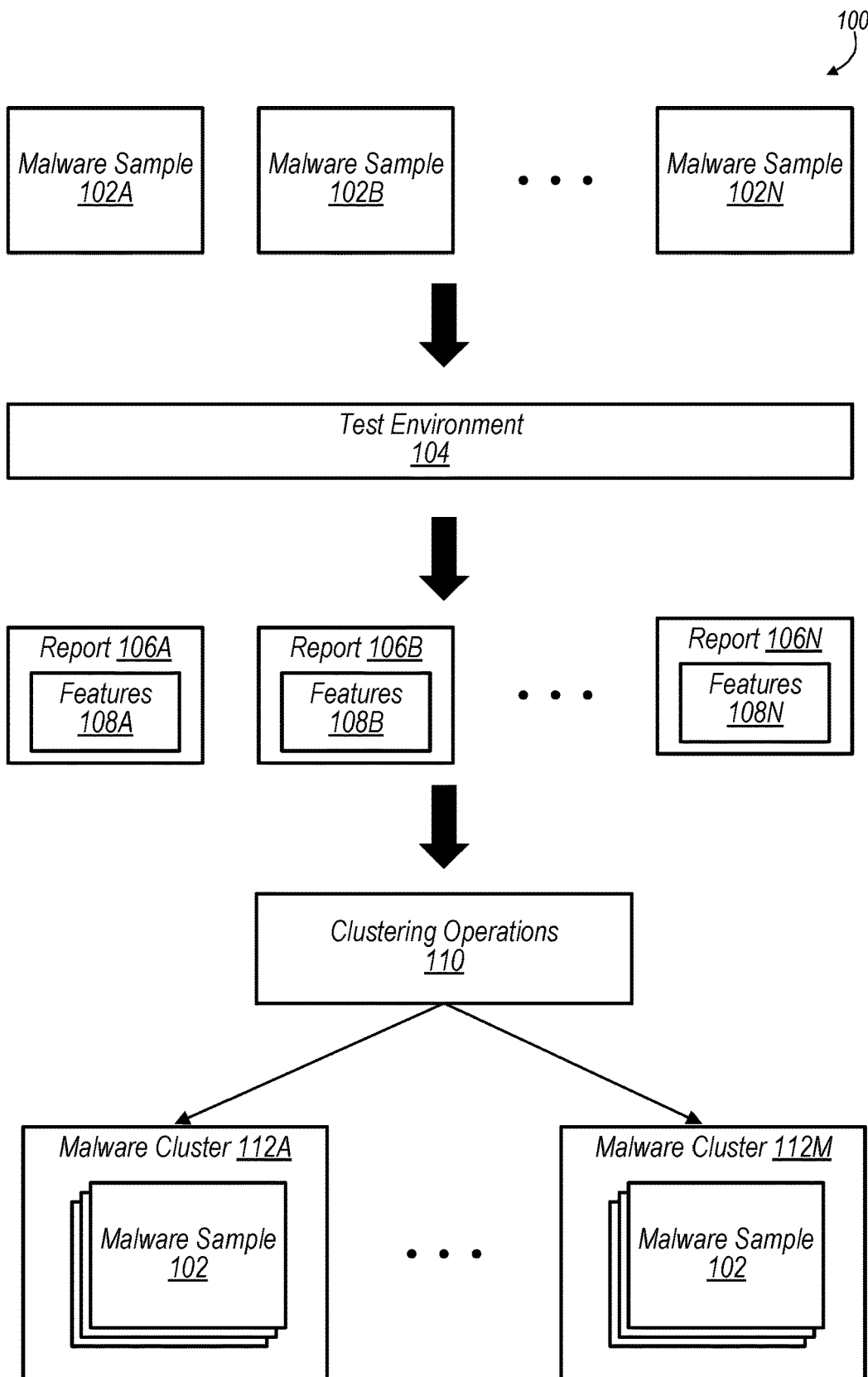
FIG. 1 is a block diagram illustrating an example system for assigning malware samples into clusters of related malware samples, according to some embodiments.

FIG. 1 shows a high-level block diagram of a system 100 for grouping malware samples into clusters, according to various embodiments of the present disclosure. FIG. 1 includes malware samples 102A-102N (referred to herein collectively as "malware samples 102" and/or singularly as "malware sample 102"). As used herein, the term "malware" is used according to its ordinary meaning in the art and includes any software program or portion of code operable to disable, disrupt, monitor, or otherwise interfere with or harm an infected computer system. For example, in some embodiments, malware may be operable to disable or damage computer hardware or to steal sensitive data, such as intellectual property, user credentials, financial information, healthcare records, etc. In some embodiments, for example, malware may include instructions to download other sets of instructions (e.g., from command and control servers), include instructions to self-replicate, seek, and deploy itself in other computers or to erase itself to avoid detection. Some non-limiting examples of types of malware include viruses, Trojans, worms, ransomware, spyware, adware, etc. Further, as used herein, the term "sample" or "malware sample" is used to refer to an instance of a particular malware variety. Thus, the malware samples 102 of FIG. 1 may include, for example, a diverse population of different types of malware (e.g., viruses, spyware, etc.) and, within the different types, numerous varieties (e.g., different varieties of spyware, etc.).

As shown in FIG. 1, each of malware samples 102 may be executed in a test environment 104 to generate corresponding reports 106A-106N (referred to herein collectively as "reports 106" and/or singularly as "report 106"). In various embodiments, test environment 104 is a controlled, isolated environment in which malware samples 102 may be safely executed. For example, test environment 104 may be a sandbox, such as the CUCKOO SANDBOX or any suitable alternative, configured to execute malware samples 102. Further, test environment 104 may log information about the execution of the malware samples 102 to generate the reports 106. For example, during execution of malware sample 102A, test environment 104 may log information corresponding to the execution behavior of malware sample 102A, such as the operations and changes of state attempted, and include that information, specified as features 108A, in the corresponding report 106A. Stated differently, reports 106 specify the set of features 108A-108N (referred to herein collectively as "features 108" and/or singularly as "feature 108") related to the execution behavior of a corresponding malware sample 102. Reports 106 may be provided in any suitable format, such as a JSON file, text file, or any other suitable format for specifying features 108 associated with the execution behavior of a corresponding malware sample 102.

The present disclosure relates to systems and methods for grouping malware samples 102 into clusters 112A-112M (referred to herein collectively as "clusters 112" and/or singularly as "cluster 112") of related malware samples that have similar characteristics. For example, various disclosed systems and methods, shown generally in FIG. 1 as clustering operations 110, use information associated with a given malware sample to group the malware samples 102 into clusters 112 of related malware samples. Note that, in many instances, there will be significantly fewer clusters 112 (e.g., 10, 50, 100, etc.) than malware samples 102 (e.g., 100,000 or more).

The present disclosure proceeds primarily in two parts. First, with reference to FIGS. 2-8, the present disclosure describes embodiments that cluster malware samples by analyzing reports 106, with the behavioral features 108 specified therein, to generate, for each of the malware samples, a corresponding vector indicative of that sample's execution behavior. In such embodiments, these vectors may be used to generate similarity values that are indicative of the extent of similarity between the vectors. The similarity values, in turn, may be used to assign the various malware samples 102 into one of a plurality of clusters 112. Then, with reference to FIGS. 9-14, the present disclosure describes techniques for clustering malware samples based on the functions called by the samples. For example, in some such embodiments, the disclosed techniques analyze code (e.g., assembly code, source code, etc.) associated with the malware samples to create, for each malware sample, a respective function call graph. These function call graphs, in turn, may be used to identify malware samples, to assign the malware samples to clusters of related malware samples, etc. Note that, in various embodiments of the function call graph-based clustering technique, the clustering operations 110 may be performed based on code (e.g., assembly code, source code, etc.) associated with the malware samples, rather than behavioral reports (as shown in FIG. 1).

Figure 2:
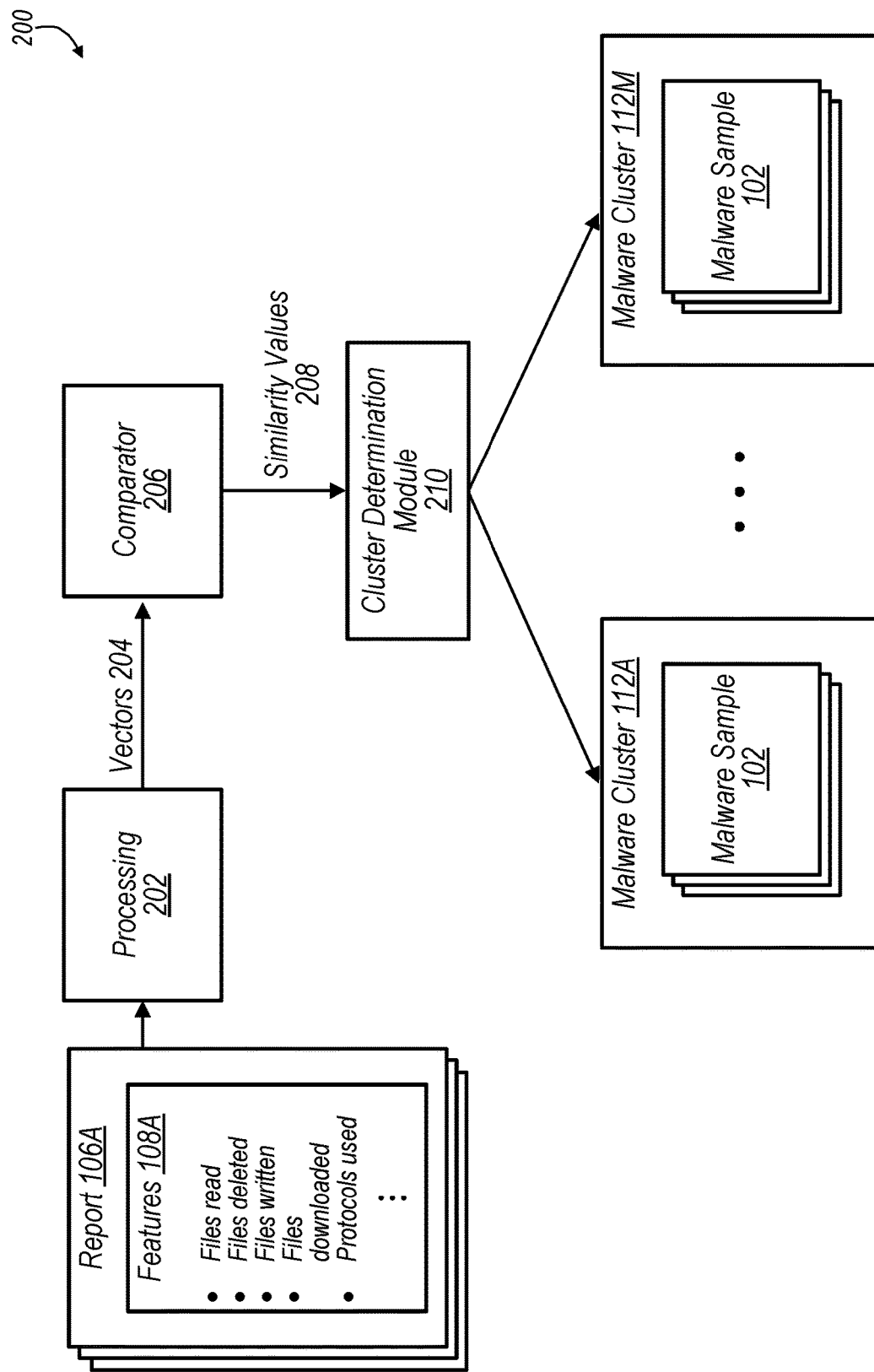
FIG. 2 is a block diagram illustrating an example system for clustering malware samples based on their execution behavior, according to some embodiments.

Referring now to FIG. 2, a block diagram of a system 200 for clustering malware samples 102 based on their execution behavior is shown, according to some embodiments. In various embodiments, system 200 may be used to group a large population of malware samples (e.g., 200,000) into a much smaller number of clusters (e.g., 50) of related malware samples.

System 200 groups the malware samples 102 into clusters 112 based on their respective execution behavior as specified by the features 108 in reports 106. That is, rather than performing the clustering operations by analyzing the malware samples themselves (e.g., the actual malware executables), system 200 groups the samples based on the reports 106 of their execution behavior when executed in a test environment 104. Reports 106 may include various features 108, as noted above. In the depicted embodiment, for example, report 106A includes features 108A, which specify the operations and changes of state attempted by corresponding malware sample 102A when it was executed in test environment 104. In FIG. 2, features 108A include the files read, files deleted, files written, files downloaded, the protocols used, etc., by malware sample 102A during execution. Note that, in various embodiments, the set of features 108 specified in a report 106 include numerous pieces of discrete information. In some such embodiments, the term "feature" is used to refer to one discrete piece or item of information specified by report 106. Further note that these features 108 are provided merely as an example and are not intended to limit the scope of the present disclosure. In other embodiments, a malware sample 102 may perform various other operations that may be specified as features 108 in a report 106.

In the depicted embodiment, system 200 first performs processing 202 on the reports 106 to generate corresponding vectors 204. In various embodiments, processing 202 includes performing various operations on the information included in the reports 106 to generate, for each of the malware samples 102, a corresponding vector 204 that is indicative of some or all of the execution behavior specified by features 108. Embodiments of processing 202 will be discussed in more detail below with reference to FIGS. 3A and 4. For the purposes of discussing FIG. 2, note that each of the vectors 204 is indicative of the execution behavior of a corresponding malware sample 102. For example, when executed in test environment 104, malware sample 102A attempts various operations and changes of state, which are specified in the corresponding report 106A. After performing processing 202 based on report 106A, system 200 generates vector 204A that is indicative of the execution behavior of malware sample 102A, in the depicted embodiment.

System 200 further includes comparator 206. In various embodiments, comparator 206 is operable to compare the vectors 204 to generate similarity values 208. Similarity values 208, in various embodiments, correspond to one or more values (e.g., represented as a series of bits, floating point values, etc.) that indicate a measure of similarity between one or more of the vectors 204. The manner in which comparator 206 generates similarity values 208 may vary in different embodiments of the present disclosure, and specific examples will be discussed in more detail with reference to FIG. 5. As one non-limiting example, comparator 206 may generate similarity values 208 by performing MinHash operations on the vectors 204, according to some embodiments. Note, however, that these embodiments are mentioned merely as an example and are not intended to limit the scope of this embodiment. In other embodiments, for example, similarity values 208 may correspond to Cosine similarity, Jaccard index values, or any other suitable indicia of similarity between vectors 204.

System 200 further includes cluster determination module 210, which, in various embodiments, is operable to group each of the malware samples 102 into one of malware clusters 112 based on the similarity values 208. While cluster determination model 210 will be discussed in more detail below with reference to FIG. 6, note that each of the malware clusters 112 corresponds to a group of malware samples 102 that have similar attributes, such as execution behavior during execution in test environment 104.

As will be appreciated by one of skill in the art with the benefit of this disclosure, a primary limitation in the clustering of large data sets (e.g., malware samples 102) is the quadratic runtime of conventional clustering algorithms, which typically compute the similarity of each pair of data. The complexity of malware clustering is further exacerbated by the sheer volume of new malware samples being developed every day (often in the order of 100,000 new samples per day). Accordingly, in various instances, it would be desirable to use a malware clustering technique that accurately assigned samples into clusters of related malware in a manner that is fast, reasonably accurate, and scalable to accommodate the magnitude of the malware clustering needs.

The disclosed systems and methods, in at least some embodiments, provide various improvements to the functioning of malware clustering systems by addressing these or other technical problems in the art. For example, many conventional malware clustering operations are performed by analyzing the malware samples themselves, which may be cumbersome and computationally expensive. Various embodiments of the present disclosure, however, perform malware clustering operations based on the reports that specify the execution behavior of the malware samples when executed in a test environment. Basing clustering on such reports may be less computationally demanding than prior approaches, in at least some embodiments.

Further, in various embodiments, a given malware sample may perform or attempt numerous operations or changes of state during execution. As described below with reference to FIG. 3A, of these various execution behaviors, only some features may be useful in performing clustering operations, while other features are common to many different types and varieties of malware, offering little insight for identification or clustering of malware samples. To address this technical problem, various disclosed embodiments (e.g., processing 202 of FIG. 3A) include selecting a reduced feature set based on a list of features that have been identified as useful in the clustering of malware samples. By performing analysis of the malware samples based on these reduced feature sets, various embodiments advantageously allow for improved speed and accuracy in performing clustering operations for malware samples.

Figure 3A:
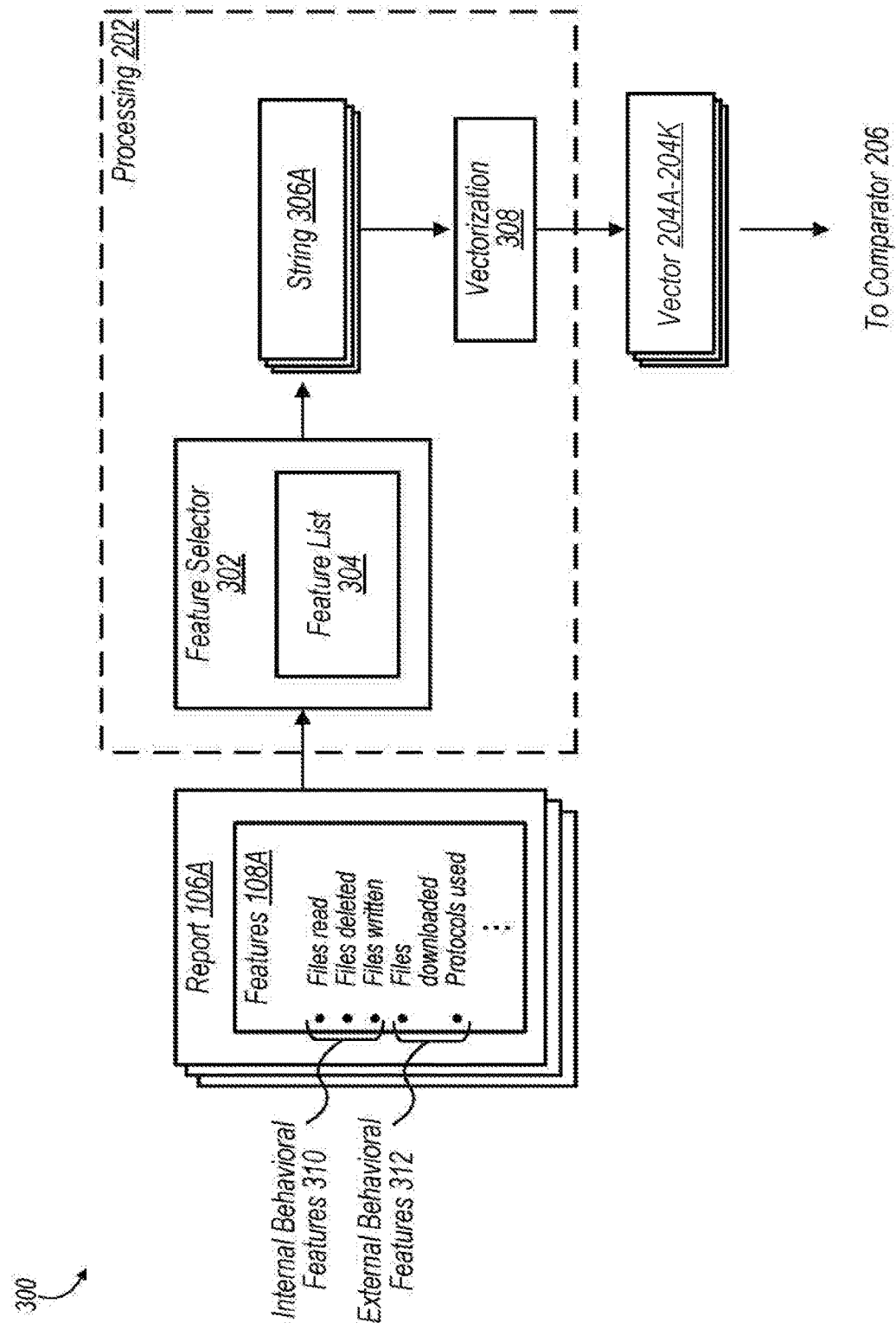
FIG. 3A is a block diagram illustrating example processing that may be performed to generate vectors based on execution behavior reports, according to some embodiments.

Referring now to FIG. 3A, block diagram 300 depicts an embodiment of processing 202 that may be performed to generate vectors 204 based on reports 106. In the depicted embodiment, processing 202 selects, from the potentially numerous features 108, a particular subset of features, the analysis of which facilitates more accurate malware clustering, as set out below.

As noted above, reports 106 include various features 108 that specify the execution behavior of (e.g., the operations and changes of state performed by) a malware sample 102 during execution in test environment 104. Though malware samples 102 may perform a wide variety of operations, the features 108, in various embodiments, include at least two broad categories of features—internal behavioral features 310 and external behavioral features 312. As used herein, an "internal behavioral feature" refers to execution behavior that attempts an operation or change of state that is local to the machine on which the malware sample is executing. For example, internal behavioral features may include, in various embodiments, files read, files written, files deleted, keys created, keys deleted, keys read, services started, etc. FIG. 3B provides a non-limiting example of various internal behavioral features 310 that may be included in the features 108 of a report 106. In FIG. 3B, the internal behavioral features 310 are specified as a set of key-value pairs in JSON format. "External behavioral features," as used herein, refer to those execution behaviors that attempt to communicate with machines external to the machine on which the malware sample is executing. For example, in some embodiments, a malware sample 102 may send DNS requests to multiple different domains and IP addresses with requests for particular data (e.g., rcode, rdata, ttl, etc.), generate other network traffic (e.g., based on HTTP, ICMP, TCP, UDP, or any other suitable communication protocol) with more granular features like destination address, port, offset, etc. FIG. 3C provides a non-limiting example of various external behavioral features 312 that may be included in the features 108 of a report 106. In FIG. 3C, the external behavioral features 312 are specified as a set of key-value pairs in JSON format.

Of the various features 108, some may be more helpful than others in performing accurate clustering operations. For example, in some instances, many different types and varieties of malware may all perform the same or similar operations, such as contacting a particular outside server to determine a current time. In these instances, the presence or absence of these common features 108 may not be useful in differentiating between types or varieties of malware samples so as to accurately group the malware samples 102 into clusters 112. Stated more generally, the presence or absence of some features 108 may not be statistically significant factors in the accurate clustering of malware samples 102 such that it is advantageous to ignore these features 108 during processing 202. Other features 108, however, may be particularly helpful in distinguishing between types and varieties of malware and, therefore, may be useful factors for clustering operations 110.

Accordingly, in the embodiment of FIG. 3A, processing 202 includes feature selector 302, which is operable to generate, for each of the reports 106, a reduced feature set based on a feature list 304. In various embodiments, feature list 304 specifies a set of features 108 that have been identified as useful in the clustering of malware samples 102. Feature list 304, in various embodiments, may be generated by the entity performing the clustering operations (e.g., by iteratively updating the set of features 108 included in feature list 304 based on the accuracy of a previous clustering attempt), by a third-party entity (e.g., a malware researcher, anti-virus company, etc.), or a combination of the two. Note that, in some embodiments, feature list 304 may be updated and refined as clustering operations are performed, as desired.

In various embodiments, feature list 304 may include internal behavioral features 310, external behavioral features 312, or both. For example, in the depicted embodiment, feature list 304 may include reading a particular local file (an internal behavioral feature 310) as well as sending a request to a particular server (an external behavioral feature 312). In this embodiment, feature selector 302 may use feature list 304 to generate, for each of the reports 106, a string 306 that specifies the presence, absence, or details of the features 108 in this reduced feature set. Consider, for example, report 106A that specifies the execution behavior of malware sample 102A. In this example, feature selector 302 may determine, based on features 108, whether malware sample 102A read the particular local file, sent a request to the particular server, etc., and generate a string 306A indicating the presence or absence of those features 108. String 306A, in some embodiments, may be represented as a concatenated list of comma-separated feature/value pairs indicating the presence, absence, or other details of features 108 specified by feature list 304. (Note that this embodiment is provided merely as an example and string 306 may be generated in any other suitable format.)

Processing 202 of FIG. 3A further includes vectorization 308, which is operable to convert the strings 306 into vectors 204. Vectorization 308 may convert strings 306 into vectors 204 using any one of various suitable techniques. As one non-limiting example, vectorization 308 may convert a string 306 into a corresponding vector 204 using a term frequency-inverse document frequency (TF-IDF) approach. In various embodiments, each of the vectors 204 includes numerical values indicative of the reduced feature set for the corresponding report 106. That is, vectorization 308 may convert the strings 306 into numerical values that are indicative of the reduced feature sets specified by the strings 306. For example, vectorization 308 may convert string 306A into a vector 204A that includes numerical values (e.g., a series of bits, floating point values, integers, etc.) that are indicative of the reduced feature set for report 106A (and, therefore, malware sample 102A). Further, in some embodiments, the set of vectors 204 may be represented as a matrix in which each column of the matrix corresponds to a different one of the vectors 204. For example, in one embodiment, each of the vectors 204 may be provided as a series of bits, and the group of vectors 204 may be represented as a bit-vector matrix in which each column corresponds to a different bit-vector 204. Once generated, vectors 204 may be provided as an input to comparator 206, which is operable to use vectors 204 to generate similarity values 208, as described in more detail with reference to FIG. 5.

Figure 4:
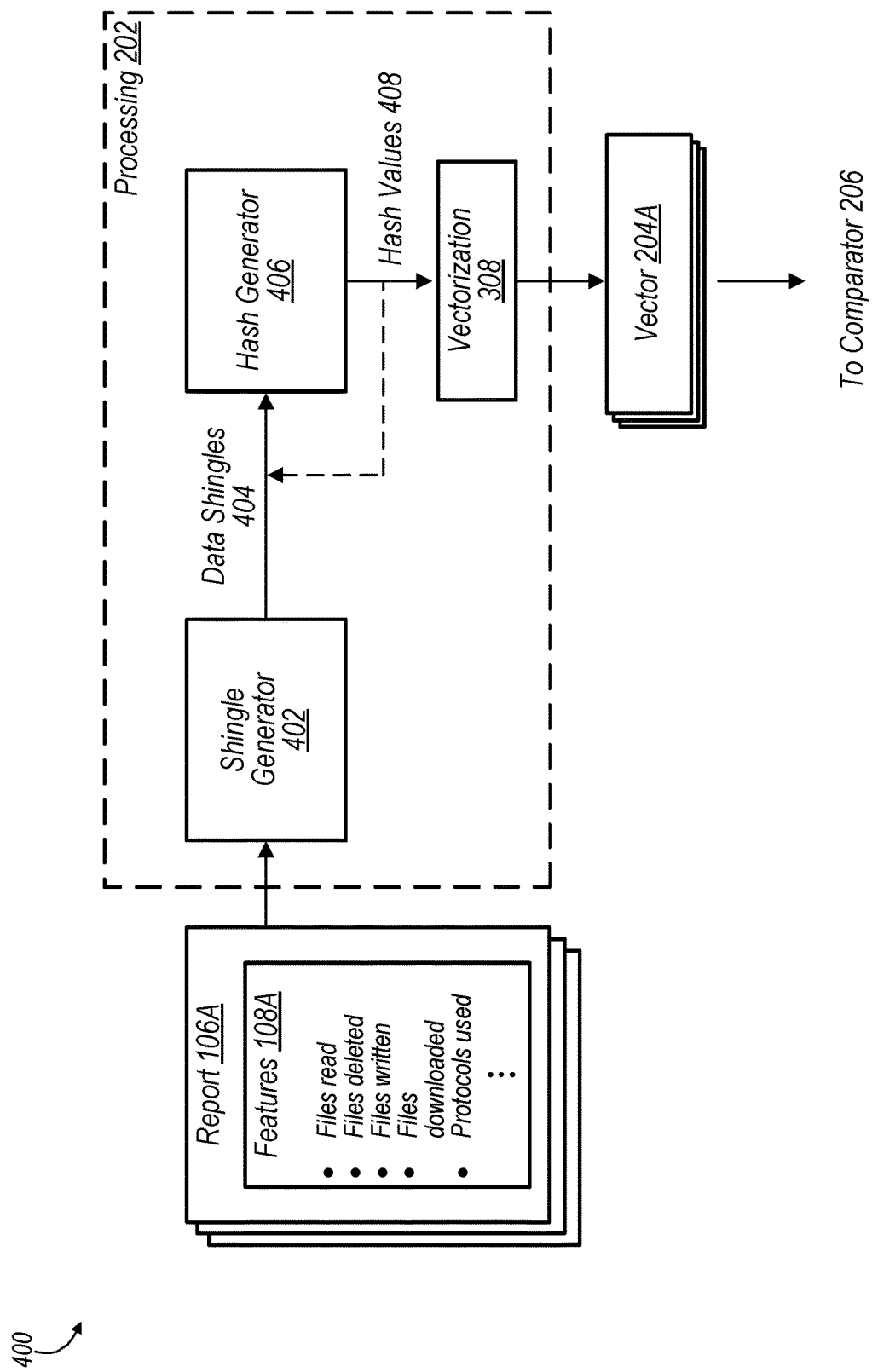
FIG. 4 is a block diagram illustrating an alternative example of processing that may be performed to generate vectors based on execution behavior reports, according to some embodiments.

Turning now to FIG. 4, block diagram 400 depicts an alternative embodiment of processing 202 that may be performed to generate vectors 204 based on reports 106. In the depicted embodiment, processing 202 derives a set of data shingles 404 (e.g., k-grams) based on each of the reports 106. In the depicted embodiment, these sets of data shingles 404 are used to generate hash values 408 and, ultimately, vectors 204, as described in more detail below.

As used herein, the terms "data shingle" and "shingle" are used according to their ordinary meaning in the art, which includes a contiguous sequence of items from a set. For example, in FIG. 4, a data shingle 404, in some embodiments, is a contiguous sequence of items (e.g., characters) specified by the features 108 of a report 106. In various instances, it may be assumed that there is positive correlation between the similarity of two sets and the similarity of the respective shingles of the two sets. For example, in some embodiments, two sets may be determined to be similar based on the number of shingles the two sets have in common or the pair-wise similarity of the shingles between the two sets. Thus, in the context of malware identification and clustering, it may be assumed that if two different malware samples 102 share many data shingles 404 in common, then these two samples 102 are similar (to at least some degree), even if the text of the samples 102 appears in a different order.

In FIG. 4, processing 202 includes shingle generator 402, which is operable to generate a set of data shingles 404 for each of the reports 106. More specifically, shingle generator 402, in the depicted embodiment, is operable to generate data shingles 404 for each of the reports 106 based on that report's respective set of features 108. For example, shingle generator 402 may generate a set of data shingles 404 based on the features 108A specified in report 106A. As will be appreciated by one of skill in the art with the benefit of this disclosure, a given set of data shingles 404 may include a sequence of k tokens from a given set of features 108. Consider, for example, a document D, where D includes the characters abcdefgh. If shingle generator 402 were to generate a set of data shingles 404 based on document D, with the token size being k=3, the set of data shingles would equal S(D)={abc, bcd, cde, def, efg, fgh}. Further, in various instances, the size of the tokens (that is, the k value) may be adjusted as a design parameter adjusted as desired based, for example, on an empirical analysis of the accuracy of the clustering operations 110.

Note that, in various embodiments, aspects of processing 202 depicted in FIGS. 3A and 4 may be combined in any suitable manner. For example, in some embodiments, processing 202 may include both feature selector 302 and shingle generator 402. In such embodiments, processing 202 may first include performing feature selection to generate a reduced feature set (e.g., including internal behavioral features, external behavioral features, or both) for each of the reports 106. After generating these reduced feature sets (e.g., specified as strings), some embodiments may include generating data shingles 404 based on these reduced feature sets. Such embodiments may further improve the functioning of the system 200 by focusing malware sample analysis on those features that are more helpful in performing accurate clustering.

For large datasets (e.g., more than 1,000,000 malware samples) computing the similarity of these samples (e.g., using Jaccard similarity) is typically a slow and computationally expensive process. To overcome this technical problem in the art, various embodiments of the present disclosure include generating hash values 408 based on the data shingles 404 in order to make subsequent analysis less time and computationally expensive. Accordingly, in FIG. 4, processing 202 includes hash generator 406, which, in various embodiments, is operable to generate hash values 408 based on data shingles 404. Hash generator 406 may use any suitable hash function to generate hash values 408, including SHA256, MD5, or any other suitable hash functions. Note that, in various embodiments, hash values 408 will be shorter than their corresponding set of data shingles 404. For example, in some embodiments, hash generator 406 may generate hash values 408 that are 4 bytes. As indicated in FIG. 4, in various embodiments, hash generator 406 may hash the data shingles 404 multiple times (e.g., twice, three times, etc.) when generating the hash values 408, which may further help generate hash values 408 that are more manageable in size than their associated data shingles 404.

Processing 202 of FIG. 4 further includes vectorization 308, which, in various embodiments, is operable to convert the hash values 408 into vectors 204. In various embodiments, each of the vectors 204 includes numerical values indicative of the data shingles 404 for a corresponding report 106. That is, vectorization 308 may convert the hash values 408 into numerical values that are indicative of the data shingles 404. For example, vectorization 308 may convert hash value 408A, into vector 204A that includes numerical values (e.g., a series of bits, floating point values, integers, etc.) that are indicative of the data shingles 404 for malware sample 102A. Once generated, vectors 204 may be provided as an input to comparator 206, which is operable to use vectors 204 to generate similarity values 208, as described in more detail with reference to FIG. 5.

Accordingly, various embodiments of the present disclosure improve the functioning of malware clustering systems, and the field of data security as a whole, by providing techniques that accurately assign malware samples into clusters of related malware in a manner that is both fast and scalable.

Figure 5:
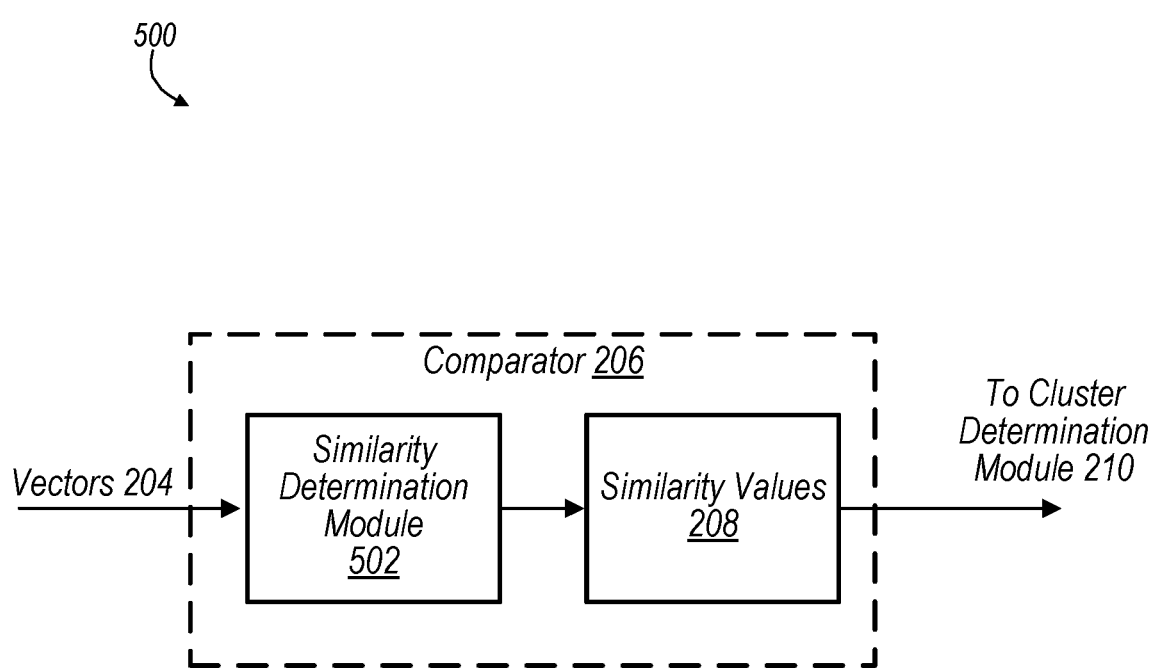
FIG. 5 is a block diagram illustrating an example comparator, according to some embodiments.

Referring now to FIG. 5, a block diagram 500 of comparator 206 is shown. In various embodiments, comparator 206 is operable to compare the vectors 204 to generate similarity values 208 that are indicative of a measure of similarity between one or more of the vectors 204. As noted above, comparator 206 may use various suitable techniques to compare vectors 204 and generate similarity values 208. Although specific embodiments are described with reference to FIG. 5, these embodiments are provided merely as examples and are not intended to limit the scope of the present disclosure.

In FIG. 5, comparator 206 includes similarity determination module 502, which, in various embodiments, is operable to determine the similarity between vectors 204. Similarity determination module 502 may use various suitable techniques to determine the similarity between vectors 204. For example, in some embodiments, similarity determination module 502 may calculate Jaccard similarity measures for various ones of the vectors 204. In some embodiments, similarity determination module 502 may calculate a Jaccard similarity measure for each respective pair of vectors in the set of vectors 204 (e.g., a Jaccard similarity measure for vectors 204A and 204B, vectors 204A and 204C, vectors 204A and 204D, etc.). In some such embodiments, the Jaccard similarity measures may be used as the similarity values 208.

In other embodiments, similarity determination module 502 may determine the similarity between vectors 204 by computing Cosine similarity measures for various ones of the vectors 204. For example, in some embodiments, similarity determination module 502 may calculate a Cosine similarity measure for each respective pair of vectors in the set of vectors 204. In some embodiments, these Cosine similarity measures may be used as the similarity values 208. Note that, in various embodiments, the Jaccard similarity measures or the Cosine similarity measures may be expressed as floating point numbers between 0.0 and 1.0, as one non-limiting example.

In still other embodiments, similarity determination module 502 may determine the similarity between vectors 204 by performing MinHash operations on the vectors 204. For example, in such embodiments, similarity determination module 502 takes as its input vectors 204 (which may be relatively long) and performs MinHash operations on the vectors 204 to generate MinHash values that are highly compressed. These MinHash values, in various embodiments, preserve the amount of similarity between the input vectors 204 and may be used as the similarity values 208. In various embodiments, similarity determination module 502 may generate MinHash values for each vector in the set of vectors 204 such that the MinHash values include, for each given vector, a set of MinHash values indicative of the similarity between the given vector and the other vectors 204. Accordingly, in various embodiments, similarity determination module 502 performs MinHash operations based on the vectors 204 to generate the similarity values 208 (e.g., the MinHash values), which, in such embodiments, may be short, integer vectors that represent the vectors 204 and reflect their similarity. As described in more detail below with reference to FIG. 6, these MinHash values, in some such embodiments, may be used by cluster determination module 210 (e.g., by running locality-sensitive hashing on the MinHash values) to assign the malware samples 102 into clusters 112.

Further note that, in some embodiments, the similarity values 208 may be provided in the form of a similarity matrix. For example, similarity determination module 502 may generate a matrix in which each vector 204 (and, therefore, each corresponding malware sample 102) is represented as a column in the matrix. Further, in such embodiments, the matrix may include, at the intersection of each row and column, a floating-point value from 0 to 1 indicating the similarity of the two intersecting vectors 204, where the number 1 indicates that the two vectors 204 are identical and the number 0 indicates that the two vectors 204 are disjoint. For example, for two vectors 204E and 204K that are determined to be 78% similar, the points at which these two vectors 204 intersect on the similarity matrix will be represented by the value 0.78, according to one embodiment.

Figure 6:
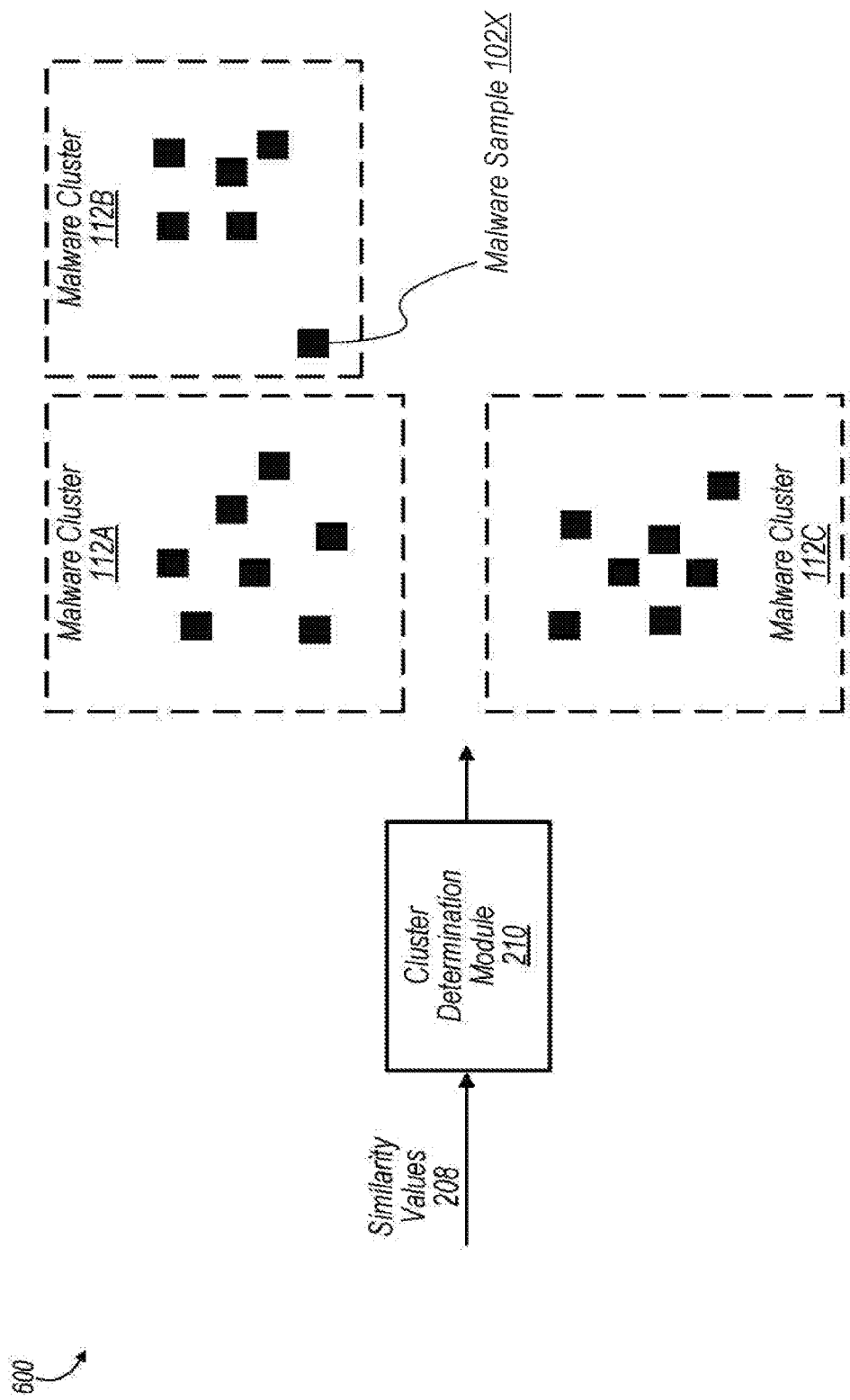
FIG. 6 is a block diagram illustrating an example cluster determination module, according to some embodiments.

Turning now to FIG. 6, a block diagram 600 of cluster determination module 210 is shown, according to some embodiments. As noted above, cluster determination module 210, in various embodiments, is operable to receive similarity values 208 (which correspond to the similarity between malware samples 102) and to assign the malware samples 102 into malware clusters 112 of related malware samples 102. In FIG. 6, the malware samples 102 are denoted by solid squares, with their respective locations indicating the similarity of the malware samples 102 relative to one another. (Note that, although only three clusters (i.e., clusters 112A-112C) are shown in FIG. 6, this simplified embodiment is provided merely as an example; in other embodiments, malware samples 102 may be assigned to any suitable number of clusters 112.)

Cluster determination module 210 may use various suitable clustering algorithms to assign malware samples 102 into clusters 112, according to various embodiments. In some embodiments, cluster determination module 210 is operable to perform affinity propagation operations to assign the malware samples 102 into clusters 112. For example, in some embodiments (e.g., embodiments in which the similarity values 208 are provided as a similarity matrix), cluster determination module 210 may iteratively perform affinity propagation operations based on the similarity values 208 until clusters 112 of the malware samples 102 have been identified. In various embodiments, this may include performing some predetermined number of iterations, repeating the affinity propagation operations until cluster boundaries are established to a threshold level, etc.

In other embodiments, cluster determination module 210 may include using locality-sensitive hashing (LSH) to assign the malware samples 102 into clusters 112. As will be appreciated by one of skill in the art with the benefit of this disclosure, for two similar—though not necessarily identical—input values, LSH operations may result, with a high probability, in the same output values. Stated differently, the LSH technique gives a high probability of collision for similar input values. This feature of LSH stands in contrast to cryptographic hash functions (e.g., SHA-256) in which small differences in input result in drastic differences in output. Accordingly, in various embodiments, LSH may be used to group similar items (e.g., malware samples 102) into the same "bucket" (e.g., cluster 112).

Note that these embodiments are provided merely as examples and are not intended to limit the scope of the present disclosure. In other embodiments, any other suitable malware clustering algorithms may be used. Further note that, in various embodiments, the elements within clusters 112 are numerical values (e.g., hash values) that correspond to vectors 204. In various embodiments, the members of each cluster 112 may be mapped back to the original malware samples 102 to identify the cluster 112 to which a given sample 102 belongs (e.g., by maintaining a mapping during each step of the clustering techniques).

Once the malware samples 102 have been assigned to clusters 112, various embodiments of the present disclosure include performing additional processing to verify and improve the accuracy of the cluster assignments. In various embodiments, this additional processing may be performed by leveraging large-scale, distributed systems frameworks (e.g., Hadoop, Spark, etc.) to run pair-wise comparisons within each cluster 112 to further strengthen the confidence of the cluster assignments. For example, with reference to FIG. 6, this additional processing may determine that the malware sample 102X, originally assigned to cluster 112B, should instead be assigned to cluster 112A as it is actually more similar to the samples in that cluster.

Example Methods

Figure 7:
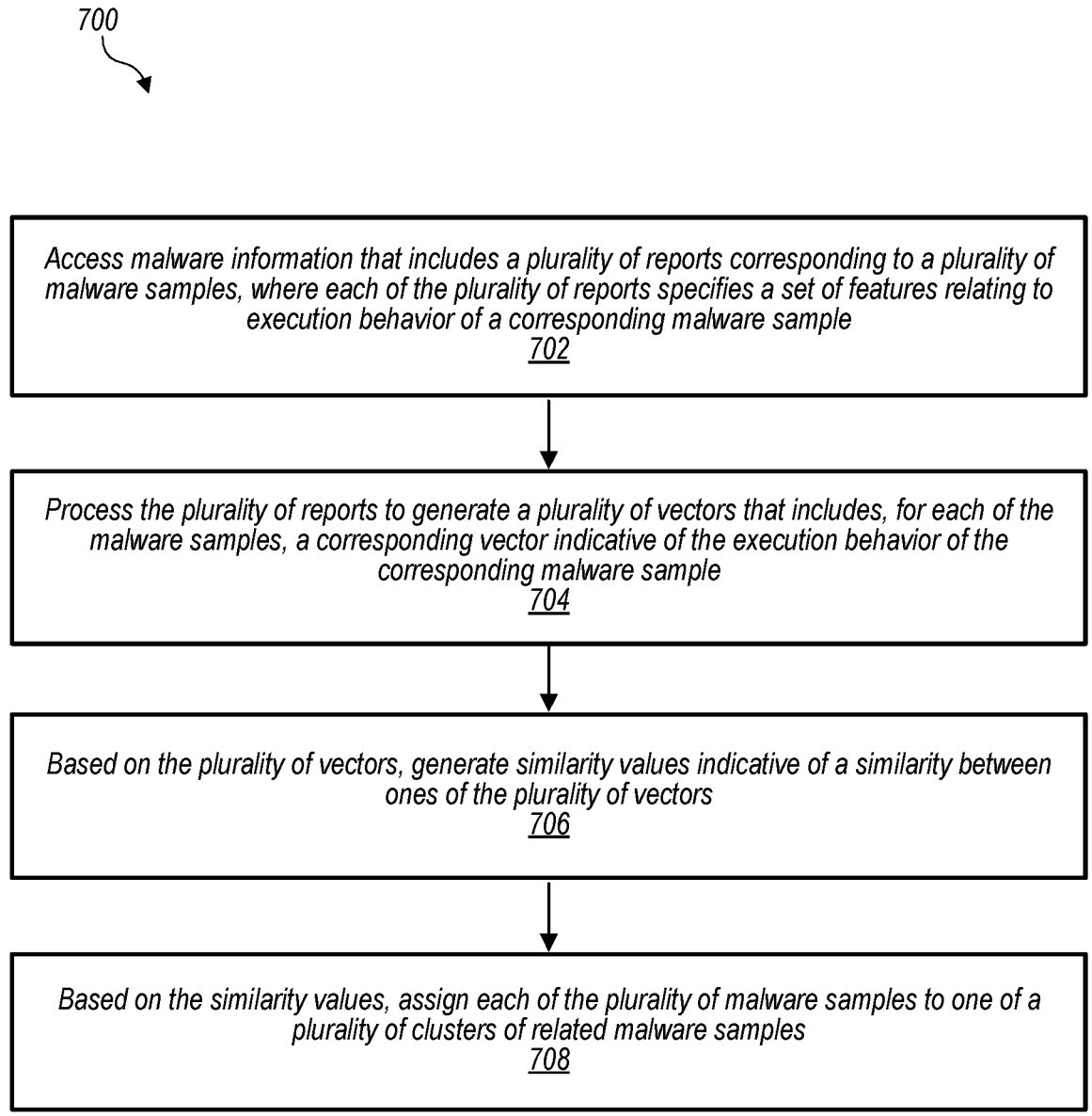
FIG. 7 is a flow diagram illustrating an example method for grouping a plurality of malware samples into clusters, according to some embodiments.

Turning now to FIG. 7, a flow diagram illustrating an example method 700 for grouping a plurality of malware samples into clusters is depicted, according to some embodiments. In various embodiments, method 700 may be performed, e.g., by system 200 of FIG. 2 to assign a population of malware samples 102 into clusters 112 of related malware samples. For example, method 700 may be performed by a computer system that includes (or has access to) a non-transitory, computer-readable medium having program instructions stored thereon that are executable by the computer system to cause the operations described with reference to FIG. 7. In FIG. 7, method 700 includes elements 702-708. While these elements are shown in a particular order for ease of understanding, other orders may be used. In various embodiments, some of the method elements may be performed concurrently, in parallel by multiple computer systems (e.g., using a large-scale, distributed systems framework, such as Hadoop, Spark, etc.), in a different order than shown, or may be omitted. Additional method elements may also be performed as desired.

At 702, in the illustrated embodiment, the computer system accesses malware information that includes a plurality of reports (e.g., reports 106) corresponding to a plurality of malware samples (e.g., samples 102), where each of the plurality of reports specifies a set of features (e.g., features 108) relating to execution behavior of a corresponding malware sample. At 704, in the illustrated embodiment, the computer system processes the plurality of reports to generate a plurality of vectors (e.g., vectors 204) that includes, for each of the malware samples (e.g., malware sample 102A), a corresponding vector (e.g., vector 204A) indicative of the execution behavior of the corresponding malware sample. In some embodiments, for example, method 700 further includes creating a matrix based on the plurality of vectors, where each column of the matrix corresponds to a different one of the plurality of vectors. Note that particular embodiments of element 704 will be discussed in more detail below with reference to FIGS. 8A and 8B.

At 706, in the illustrated embodiment, the computer system generates, based on the plurality of vectors, similarity values (e.g., similarity values 208) indicative of a similarity between ones of the plurality of vectors. For example, in some embodiments, generating the similarity values includes performing a plurality of MinHash operations based on the plurality of vectors included in the matrix to generate, for each of the plurality of malware samples, a set of MinHash values. In other embodiments, generating the similarity values includes, based on the plurality of vectors, generating a similarity matrix that specifies a similarity between each pair of the plurality of vectors.

At 708, in the illustrated embodiment, the computer system assigns, based on the similarity values, each of the plurality of malware samples to one of a plurality of clusters (e.g., malware clusters 112) of related malware samples. In some embodiments, the assignment includes grouping each of the plurality of vectors into one of the plurality of clusters of related malware samples. For example, in some embodiments, the assignment is performed using locality-sensitive hashing. In some embodiments, the assigning is performed, for a given malware sample (e.g., sample 102B) of the plurality of malware samples, based on its respective set of MinHash values (e.g., by performing LSH on the set of MinHash values corresponding to sample 102B). In other embodiments, the assigning is performed based on a similarity matrix that specifies a similarity between each pair of the plurality of vectors. Further note that, in some instances, it may be the case that only one cluster arises after the elements of method 700 are performed. In such instances, element 708 may include assigning each of the plurality of malware samples to the one cluster 112.

In some embodiments, method 700 further includes the computer system generating the plurality of reports (e.g., reports 106). For example, in such embodiments, generating the reports may include the computer system executing one or more of the malware samples in a test environment, monitoring the execution behavior of the one or more malware samples during execution, and logging information specifying the set of features for the one or more malware samples. Note, however, that the reports specifying the sets of features may be generated either by the computer system performing the clustering operations, by one or more third-parties, or both. In the case in which a report is generated by a third-party, that third-party may execute the malware sample 102 in a test environment 104 to generate the report 106 and may then provide the report 106 to the entity that is to perform the clustering operations.

Figure 8A:
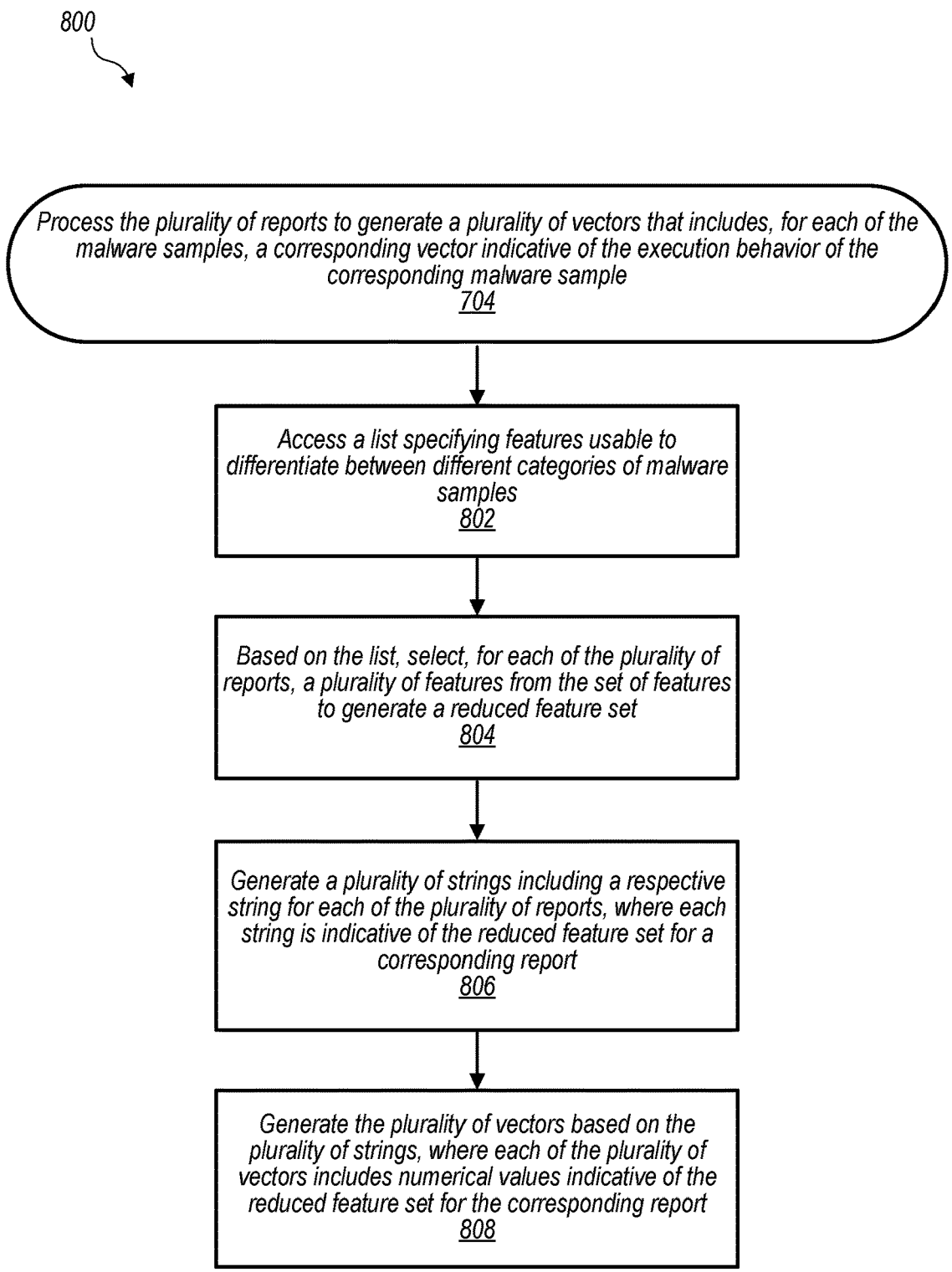

The following discussion, with reference to FIGS. 8A and 8B, describes two particular embodiments of processing the plurality of reports to generate a plurality of vectors, as shown in element 704. More specifically, FIG. 8A provides a method 800 for processing that selects, from potentially numerous features, a particular subset of features that, in various embodiments, facilitate more accurate malware clustering, as described above with reference to FIGS. 3A-3C. FIG. 8B provides a method 850 for processing that utilizes data shingles and hash values derived from the reports to generate the plurality of vectors, as described above with reference to FIG. 4.

Turning now to FIG. 8A, a flow diagram illustrating an example method 800 for processing a plurality of reports to generate a plurality of vectors is shown, according to some embodiments. In various embodiments, method 800 may be performed, e.g., by processing 202 described in FIG. 3A. In FIG. 8A, method 800 includes elements 802-808. While these elements are shown in a particular order for ease of understanding, other orders may be used. In various embodiments, some of the method elements may be performed concurrently, in parallel by multiple computer systems (e.g., using a large-scale, distributed systems framework), in a different order than shown, or may be omitted. Additional method elements may also be performed as desired.

Element 802, in the illustrated embodiment, includes accessing a list (e.g., feature list 304 of FIG. 3A) specifying features usable to differentiate between different categories of malware samples. For example, feature list 304 may specify internal and external behavioral features that may facilitate more accurate malware clustering, relative to embodiments in which all available features are analyzed. Element 804, in the illustrated embodiment, includes, based on the list, selecting, for each of the plurality of reports, a plurality of features from the set of features to generate a reduced feature set. For example, feature selector 302 may select, based on feature list 304, a plurality of features from the set of features 108 to generate a reduced feature set for each of the reports 106.

Element 806, in the illustrated embodiment, includes generating a plurality of strings including a respective string for each of the plurality of reports, where each string is indicative of the reduced feature set for a corresponding report. For example, feature selector 302 may use feature list 304 to generate, for each of the reports 106, a string 306 that specifies the presence, absence, or details of the features in this reduced feature set. Element 808, in the illustrated embodiment, includes generating the plurality of vectors based on the plurality of strings, where each of the plurality of vectors includes numerical values indicative of the reduced feature set for the corresponding report. For example, vectorization 308, in various embodiments, is operable to convert the strings 306 into vectors 204, each of which includes numerical values indicative of the reduced feature set for the corresponding report 106.

Referring now to FIG. 8B, a flow diagram illustrating an alternative method 850 for processing a plurality of reports to generate a plurality of vectors is shown, according to some embodiments. In various embodiments, method 850 may be performed, e.g., by processing 202 described in FIG. 4. In FIG. 8B, method 850 includes elements 852-856. While these elements are shown in a particular order for ease of understanding, other orders may be used. In various embodiments, some of the method elements may be performed concurrently, in parallel by multiple computer systems (e.g., using a large-scale, distributed systems framework), in a different order than shown, or may be omitted. Additional method elements may also be performed as desired.

Element 852, in the illustrated embodiment, includes generating, based on the malware information, a plurality of data shingles that includes, for each of the plurality of reports, a respective set of data shingles. For example, shingle generator 402 may generate a set of data shingles 404 for each of the reports 106 based on that report's respective set of features 108.

Element 854, in the illustrated embodiment, includes generating a plurality of hash values based on the plurality of data shingles, where the plurality of hash values includes, for each of the plurality of reports, a corresponding hash value that is based on a respective set of data shingles. For example, hash generator 406 may generate hash values 408 based on data shingles 404 using any suitable hash function. Element 856, in the illustrated embodiment, includes encoding the plurality of hash values to generate the plurality of vectors. For example, vectorization 308 may convert the hash values 408 into vectors 204 that include numerical values that are indicative of the respective data shingles 404, according to some embodiments.

Malware Identification and Clustering Based on Function Call Graph Similarity

Conventional malware detection techniques are typically based on malware signatures, treating malware samples as sequences of bytes. Malware writers have increasingly developed malware variants that use code obfuscation techniques to make it more difficult to follow the malware code (e.g., source code, assembly code, etc.) and discern its functionality. While conventional malware detection approaches perform well for known malware samples, they are syntax-based and can often be bypassed by simple code obfuscation techniques. This problem is further exacerbated by the availability of automated toolkits (e.g., Tox, Mistfall, Simile, RPME, etc.) that allow malware writers to quickly create variants from existing malware samples. Accordingly, in various instances, it would be desirable to use a malware detection technique that identified malware samples based on their functionality, rather than strictly by their syntax, such that the malware samples could be accurately identified despite code obfuscation efforts.

With reference to FIGS. 9-14, the present disclosure describes systems and methods for identifying and clustering malware samples based on the functions called by the malware samples. Because a program's functionality is primarily determined by the function calls (e.g., library or system calls, etc.) it invokes, its function-call graph provides a reasonable approximation to the program's run-time behavior. Therefore, in various embodiments, the function-call graphs of malware variants that are derived from the same code are often similar to one another. Accordingly, various embodiments analyze code (e.g., assembly code, source code, etc.) associated with the malware samples to create, for each malware sample, a respective function-call graph. These function-call graphs, in turn, may be used to identify malware samples or to assign the malware samples to clusters of related malware samples. By representing each malware sample in terms of its function-call graph, various embodiments of the present disclosure facilitate identification and clustering of malware samples based on their functional behavior, rather than by syntax alone, thwarting various code obfuscation techniques that may have been applied to the malware samples. Thus, the disclosed systems and methods, in at least some embodiments, improve the functioning of malware identification and clustering systems and data security as a whole.

Figure 9:
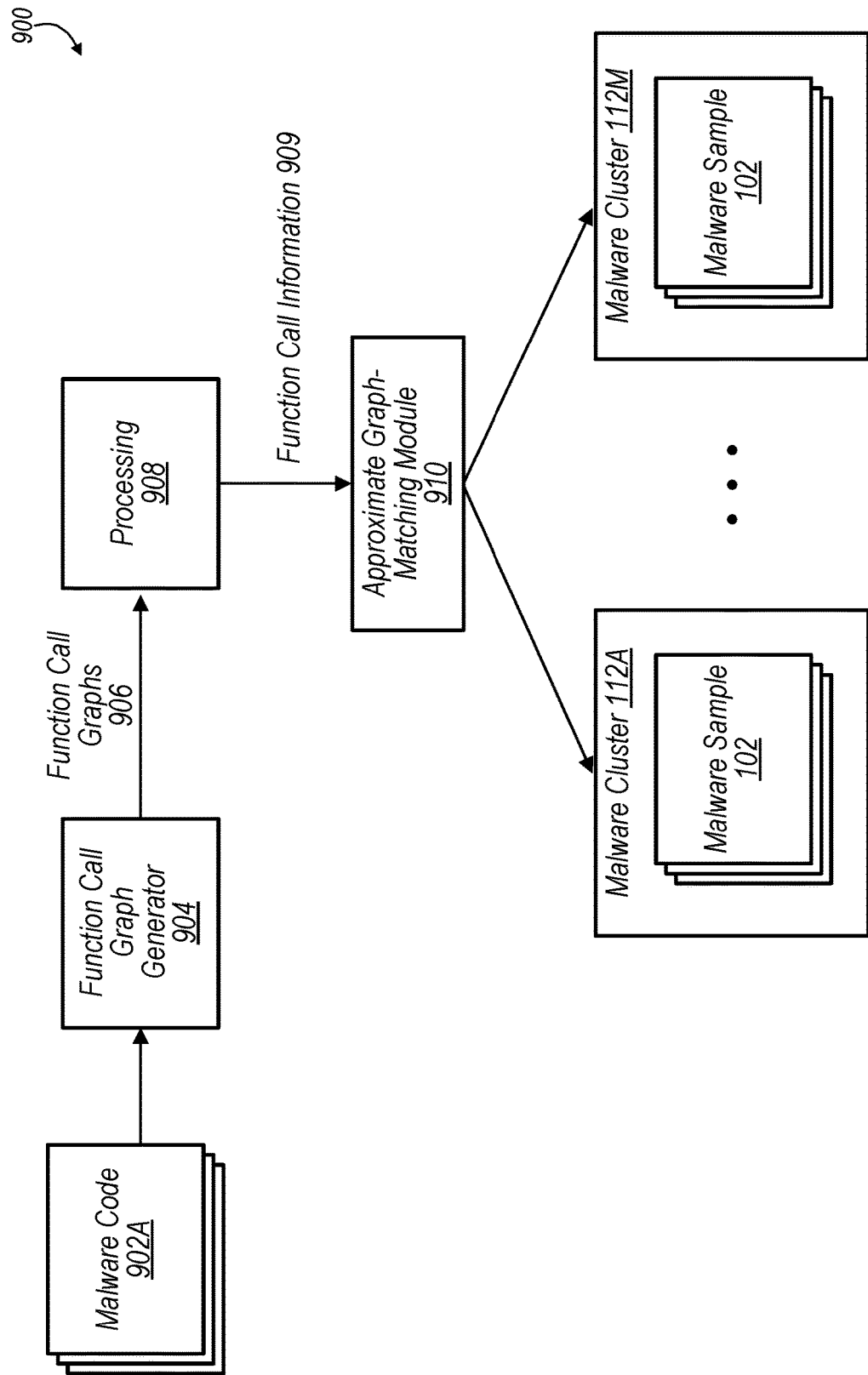
FIG. 9 is a block diagram illustrating an example system for clustering malware samples based on the functions called by the malware samples, according to some embodiments.

Turning now to FIG. 9, a block diagram of a system 900 for clustering malware samples based on the functions called by the malware samples is shown, according to some embodiments.

Figure 10:
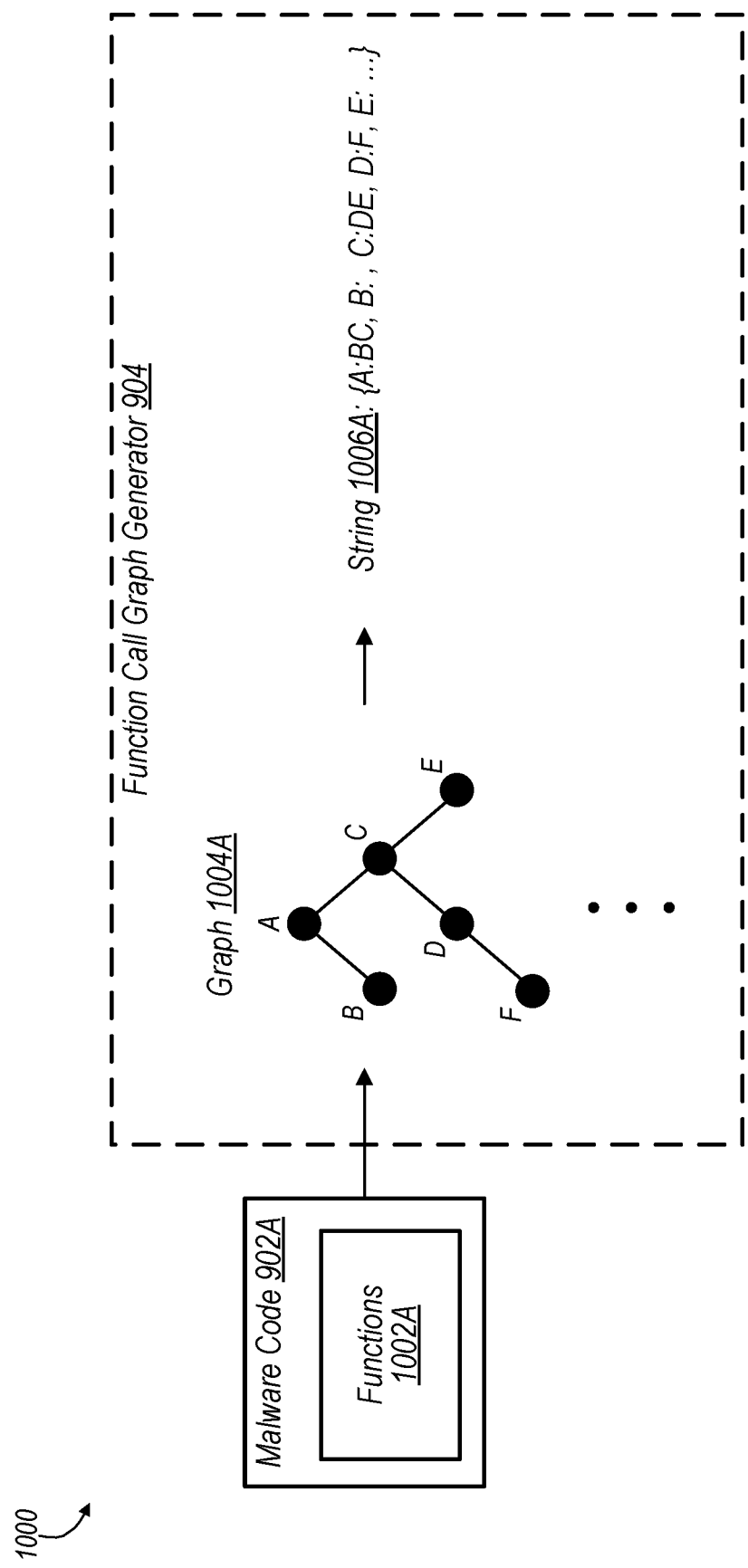
FIG. 10 is a block diagram illustrating an example function call graph generator, according to some embodiments.

System 900 includes function call graph generator 904, which, as discussed in more detail below with reference to FIG. 10, is operable to generate function call graphs 906 based on malware code 902. More specifically, function call graph generator 904 may generate a function call graph 906 (e.g., specified as a string) for each malware sample 102 based on the sample 102's respective malware code 902. Malware code 902 may include instructions for malware samples 102 provided in any suitable language or representation. For example, in some embodiments, malware code 902 may be provided in a binary representation, an assembly language representation, or a higher-level language (e.g., C, C++, JAVA, etc.) representation and may specify the function calls performed by a given malware sample. For example, malware code 902A may be code (e.g., assembly code) associated with malware sample 102A and may specify the functions called by malware sample 102A.

System 900 of FIG. 9 further includes processing 908, which, in various embodiments, is operable to generate function call information 909 based on function call graphs 906. For example, processing 908, in various embodiments, may generate function call information 909 for each of the function call graphs 906. In various embodiments, function call information 909 includes statistical properties associated with corresponding malware samples 102. For example, in some embodiments, the set of statistical properties includes information such as the functions called, the number of times each function is called, an order or hierarchy of the functions called, the number of external function calls, the number of local function calls, the list number of local function calls, the number of callees, the caller identity, the number of callers, function types, etc.

System 900 further includes approximate graph-matching module 910. As described in more detail with reference to FIG. 11, approximate graph-matching module 910, in various embodiments, is operable to compare function call graphs associated with malware samples by performing approximate subgraph-matching operations. More specifically, in various embodiments, approximate graph-matching module 910 is operable to compare function call graphs 906 based on their respective function call information 909 (e.g., statistical properties) to determine the similarity of function call graphs 906 and, by extension, their corresponding malware samples 102. In the embodiment of FIG. 9, approximate graph-matching module 910 may use these similarity determinations to assign each of the plurality of malware samples 102 into one of the clusters 112 based on the function call information 909.

Referring now to FIG. 10, a block diagram 1000 of function call graph generator 904 is shown, according to some embodiments. In various embodiments, function call graph generator 904 is operable to generate function call graphs 906 based on malware code 902.

FIG. 10 shows malware code 902, which, as discussed above, includes instructions associated with malware samples 102. For example, malware code 902A includes instructions, including various functions 1002A, associated with malware sample 102A. Malware code 902 may take various formats. For example, in some embodiments, malware code 902A may be assembly code generated by a disassembler based on malware sample 102A, high-level source code (e.g., C++) generated by a decompiler based on malware sample 102A, etc. In other embodiments, however, malware code 902A may include various directed graphs specifying information about the functions 1002A called by malware sample 102A. For example, in some such embodiments, the malware code 902A may specify the functions called, identify the order and sequence of function calls, the number of times each function was called, etc.

FIG. 10 further includes graph 1004A, which, in the depicted embodiment, is a graphical representation of the function call graph for malware sample 102A (Note that graph 1004A is provided to facilitate understanding of the present disclosure and, in various embodiments, function call graph generator 904 may not generate the graphical representation of a function call graph, as in FIG. 10.) Graph 1004A of FIG. 10 includes vertices A-F connected by edges. In the depicted embodiment, the vertices A-F denote the different functions 1002A called by malware sample 102A and the edges represent the relationships (e.g., caller/callee relationships) between the functions. For example, in graph 1004A, function A calls both functions B and C, function C calls functions D and E, function D calls function F, etc.

In various embodiments, function call graph generator 904 is operable to generate graph 1004A by analyzing the functions 1002A called in malware code 902A. For example, in some embodiments, function call graph generator 904 may first identify the functions 1002A called in malware code 902A and assign a label to each of the functions 1002A. That is, in some embodiments, malware writers may give opaque names to the functions 1002A in malware code 902 to further conceal the function of the corresponding malware sample 102. Accordingly, in various embodiments, it may be desirable to simplify the graph-generation process by replacing some or all of the function names in malware code 902 with simplified labels (e.g., A-F, in the depicted embodiment).

Further, in generating graph 1004A, function call graph generator 904 may identify the relationships between the functions 1002A called in code 902A. For example, it may determine, for a given function, which functions it called and which functions called it. Based on the labels and relationship information, function call graph generator 904 may generate graph 1004A. In various embodiments, graphs 1004 may be represented as strings 1006 to facilitate analysis of the statistical properties of the function call graph 906. Function call graph generator 904 may generate the strings 1006 according to various techniques. In the depicted embodiment, function call graph generator 904 generates string 1006A as a series of comma-separated values that identify parent-child node relationships. For example, as shown in FIG. 10, the first value in string 1006A is "A:BC," which denotes that the parent node A has two child nodes, B and C. This value, then, denotes that in the function call graph 1004A, function A calls functions B and C. The second value in string 1006A is "B: ," which denotes that the parent node B has no child nodes. This value, then, denotes that in the function call graph 1004A, function B does not call any functions. The string 1006A proceeds in this manner until the entire function call graph 1004 for malware code 902 is represented in the string. In various embodiments, strings 1006, representing the corresponding function call graphs 906, may be used as inputs to processing 908, which may use the strings 1006 to generate function call information 909.

Figure 11:
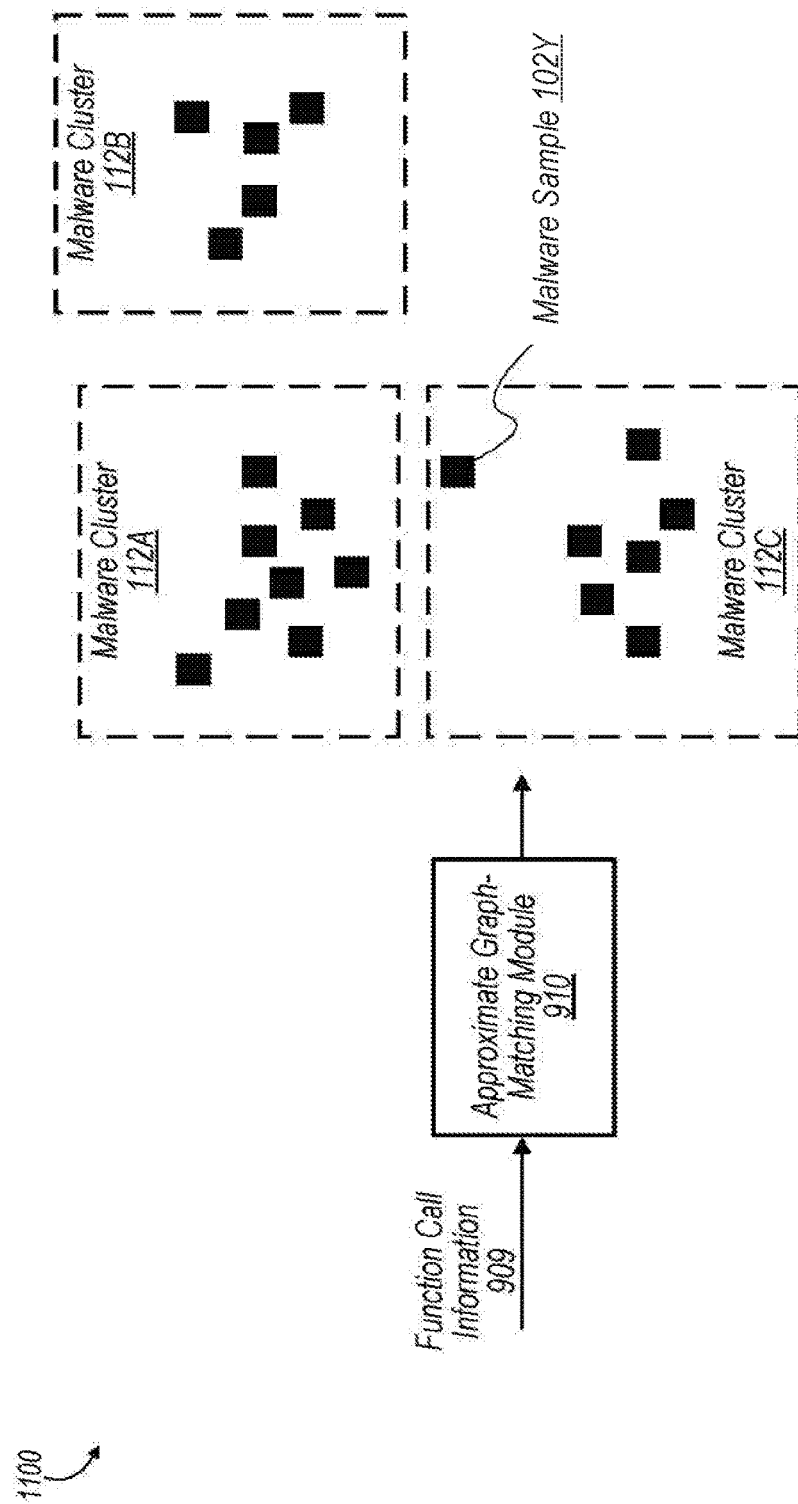
FIG. 11 is a block diagram illustrating an example approximate graph-matching module, according to some embodiments.

Turning now to FIG. 11, a block diagram 1100 of an approximate graph-matching module 910 is shown, according to some embodiments. As noted above, approximate graph-matching module 910, in various embodiments, is operable to compare function call graphs associated with malware samples by performing approximate subgraph-matching operations. More specifically, in various embodiments, approximate graph-matching module 910 is operable to compare function call graphs 906 based on their respective function call information 909 (e.g., statistical properties) to determine the similarity of function call graphs 906 and, by extension, their corresponding malware samples 102.

Such a similarity determination may be used for various purposes. For example, as discussed below with reference to FIG. 12, approximate graph-matching module 910 may be used to determine identifying information about a newly encountered malware sample 102 by comparing its function call graph to a store of malware information (such as function call graphs, statistical properties, etc.) associated with previously analyzed malware samples. In the embodiment depicted in FIG. 11, approximate graph-matching module 910 may be used to assign one or more malware samples 102 to previously established cluster 112, or to group a population of malware samples 102 into a plurality of new or existing clusters 112.

Approximate graph-matching module 910 may use any of various suitable approximate subgraph-matching algorithms and techniques, according to various embodiments. For example, in various embodiments, approximate graph-matching module 910 determines the similarity between two malware samples 102 based on the similarity of their underlying function call graphs 906. In various embodiments, the function call graphs 906 are directed, labelled trees and the similarity of the function call graphs 906 may be characterized based on the statistical significance captured by chi-square statistics. As will be appreciated by one of skill in the art with the benefit of this disclosure, the chi-square statistical model takes into account the background structure and label distribution in the neighborhood of vertices to obtain the best matching subgraphs. Accordingly, such approaches typically are quite robust in their handling of structural mismatches. In some embodiments, approximate graph-matching module 910 uses one or both of the VELSET or NAGA algorithms, which, in general, return the top k most similar subgraphs from a large store (e.g., database) of graphs. In various embodiments, the utilization of these algorithms by approximate graph-matching module 910 allows for a fast and scalable approach to approximate graph-matching for use in embodiments of the present disclosure. Note, however, that the VELSET and NAGA algorithms are discussed only as one non-limiting example and various other suitable algorithms may be used in other embodiments.

Note that, once the malware samples 102 have been assigned to clusters 112, various embodiments of the present disclosure include performing additional processing to verify and improve the accuracy of the cluster assignments. In various embodiments, this additional processing may be performed by leveraging large-scale, distributed systems frameworks (e.g., Hadoop, Spark, etc.) to run pair-wise comparisons within each cluster 112 to further strengthen the confidence of the cluster assignments. For example, with reference to FIG. 11, this additional processing may determine that the malware sample 102Y, originally assigned to cluster 112C, should instead be assigned to cluster 112A as it is actually more similar to the samples in that cluster.

Figure 12:
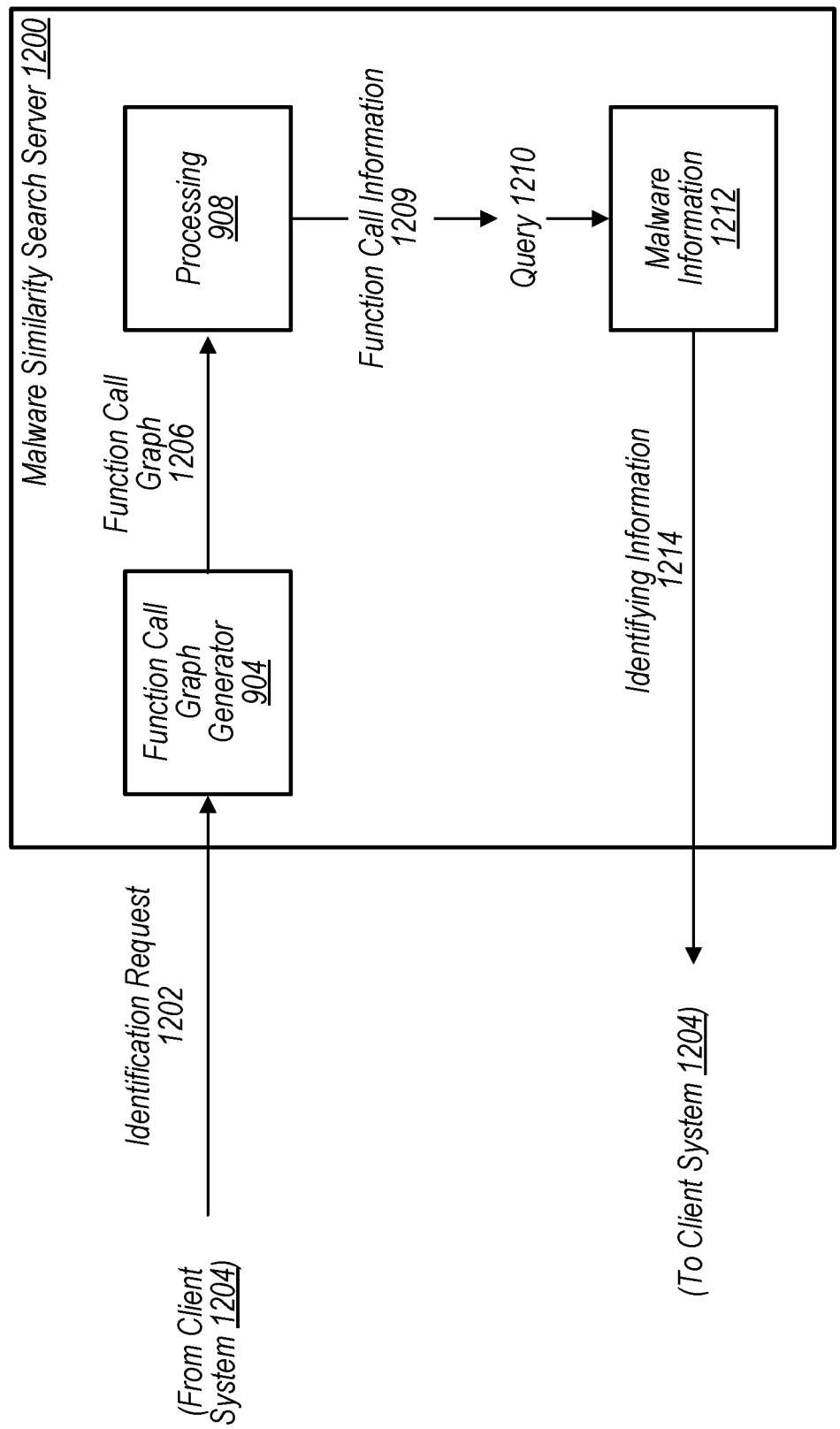
FIG. 12 is a block diagram illustrating an example malware identification server, according to some embodiments.

Referring now to FIG. 12, a block diagram of a malware similarity search server 1200 is shown, according to some embodiments. In various embodiments, malware similarity search server 1200 is configured to determine identifying information about a malware sample (e.g., a newly encountered malware sample) based on its function call graph. In some embodiments, malware similarity search server 1200 includes a large-scale, distributed graph database, which may store information (e.g., function call graphs, statistical information, etc.) regarding various malware samples (e.g., all previously encountered malware samples 102, in one embodiment). As described in more detail below, when a new malware is encountered, server 1200 may, in some embodiments, generate a function call graph from this newly encountered malware. Further, the server 1200 may generate a query based on this function call graph and query the graph database to identify a cluster of malware samples that are similar to this newly encountered malware sample, according to some embodiments.

In FIG. 12, malware similarity search server 1200 receives an identification request 1202 from client system 1204. (Note that, although malware similarity search server 1200 is described in the context of a server/client model in FIG. 12, any other suitable service model may be implemented as desired.) In various embodiments, identification request 1202 includes information corresponding to a particular malware sample (e.g., newly encountered malware sample 102) and requests identification of the sample from malware similarity search server 1200. The information included in identification request 1202 may vary in different embodiments. For example, in some embodiments, identification request 1202 includes a copy of the malware sample 102, code associated with the malware sample 102 (e.g., assembly code, source code, etc.), function call information for the malware sample 102, etc.

As shown in FIG. 12, malware similarity search server 1200 includes function call graph generator 904, in the illustrated embodiment. In various embodiments, function call graph generator 904 is operable to generate a function call graph 1206 based on the information included in identification request 1202. For example, assume that identification request 1202 includes code associated with newly encountered malware sample 102. In such an embodiment, function call graph generator 904 may generate function call graph 1206 for malware sample 102 based on the code included in identification request 1202. As described above, function call graph 1206 may be provided in string format in various embodiments, where the string is indicative of the structure of the function call graph 1206 for the malware sample 102.

Malware similarity search server 1200 of FIG. 12 further includes processing 908, which, in various embodiments, is operable to generate function call information 1209 based on the function call graph 1206. For example, in various embodiments, processing 908 may determine statistical properties associated with malware sample 102 based on the function call graph 1206. In some embodiments, function call information 1209 may include information such as the functions called, the number of times each function is called, an order or hierarchy of the functions called, etc.

Malware similarity search server 1200 of FIG. 12 further includes malware information 1212. In various embodiments, the disclosed systems and methods may retain malware information 1212 about the malware samples 102 that it analyzes for use in subsequent identification and clustering operations. For example, with reference to FIG. 9, system 900 may retain information (such as the statistical properties for the malware samples, the function call graphs for the malware samples, the clusters into which the samples were assigned, etc.) after rounds or iterations of malware identification or clustering operations have been performed. In various embodiments, such information may be stored in malware information 1212 and used to facilitate the continued identification and clustering of malware samples. In the depicted embodiment, once the function call information 1209 has been determined, malware similarity search server 1200 may execute a query 1210 (e.g., a SQL query, NoSQL query, etc.) against malware information 1212 to determine identifying information 1214 associated with the malware sample 102. For example, in some embodiments, the identifying information 1214 may include a type of the malware sample 102 (e.g., Trojan, worm, adware, etc.), identify other malware samples of which malware sample 102 is a variation, lineage information, whether the malware sample 102 fits within a cluster and, if so, information regarding the cluster, etc. In some embodiments, execution of query 1210 may return information identifying all malware samples that match the malware sample 102 to at least a predetermined threshold of similarity (e.g., a similarity score of 95% or greater, latency of 0.1 ms, etc.).

In various embodiments, malware similarity search server 1200 may provide this identifying information 1214 to the client computer system 1204. Further, as indicated in FIG. 12, malware similarity search server 1200 may retain identifying information 1214 associated with malware sample 102 in malware information 1212 such that the information 1214 may be included in the data set against which future queries are performed. This, in turn, may facilitate improved malware clustering for future malware samples that are variants of sample 102.

Note that, in various embodiments, malware similarity search server 1200 may be configured to determine the predetermined similarity threshold used to identify the malware samples that match the malware sample 102. For example, in some embodiments, malware similarity search server 1200 begins with an initial threshold (e.g., a similarity score of 92%) that it applies to the clustering model. Malware similarity search server 1200 may then, in some embodiments, monitor quality measures associated with the clusters 112 over a period of time and adjust this initial threshold algorithmically based on the feedback of quality measures to arrive at a new predetermined threshold. In various instances, this new threshold value could be different than or the same as the previous threshold value, depending on the quality measures. With temporary reference to FIG. 1, system 100 may, in some embodiments, include performing cluster monitoring and quality assessment operations after clustering operations 110 have assigned the malware samples 102 into clusters 112. In some such embodiments, the predetermined threshold may be adjusted (e.g., to generate a new predetermined threshold value) based on the quality of the initial clustering assignments, and the clustering operations 110 may be repeated on subsequent similarity-search queries using the new threshold. Further note that, in some embodiments, this process of monitoring quality measures for the clusters 112 and adjusting the predetermined threshold may be repeated as desired, but, in at least some embodiments, the need for adjusting the predetermined threshold will become less frequent as time progresses.

Example Methods

Figure 13:
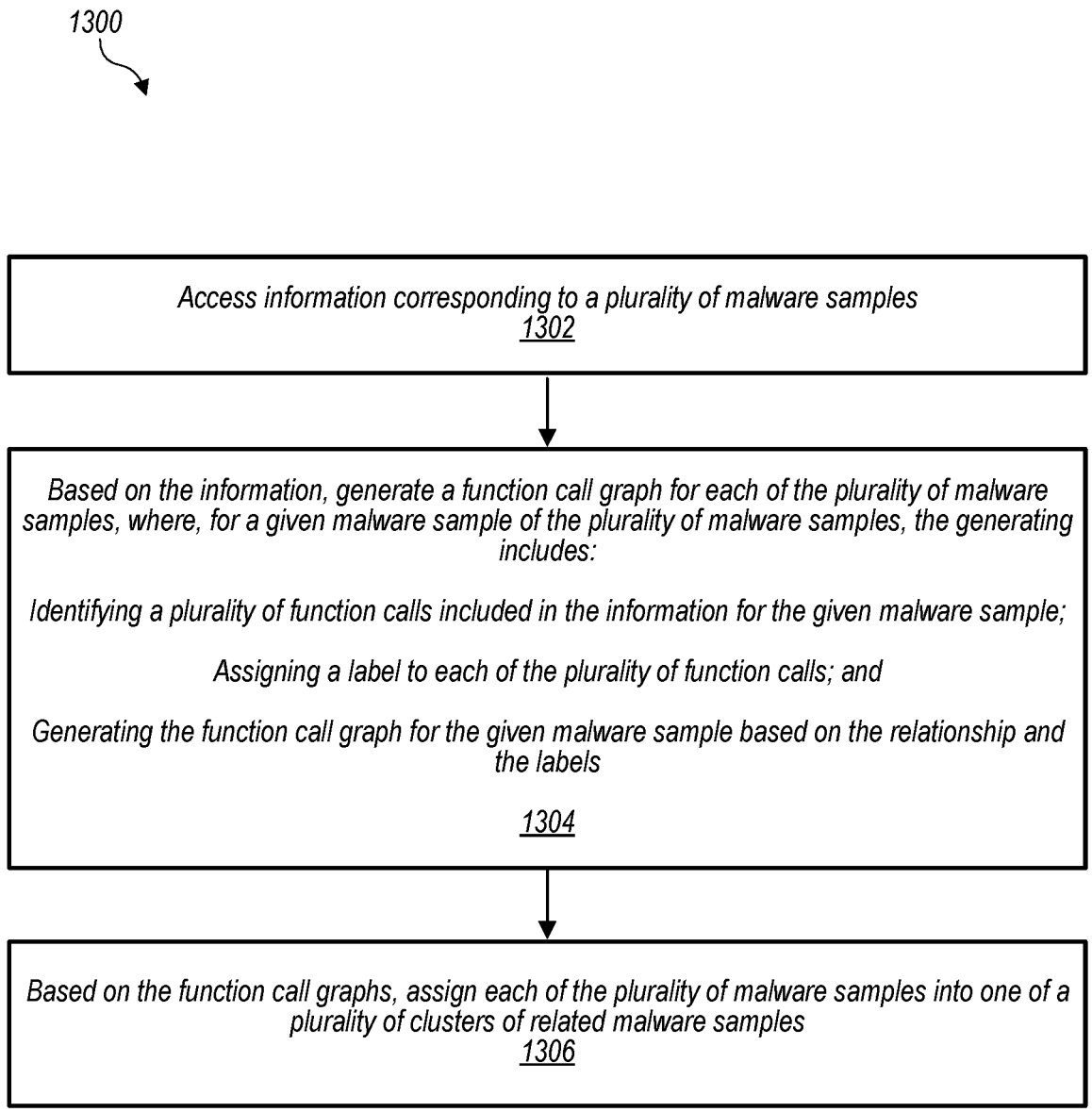
FIG. 13 is a flow diagram illustrating an example method for grouping malware samples into clusters based on the functions called by the malware samples, according to some embodiments.

Turning now to FIG. 13, a flow diagram illustrating an example method 1300 for grouping malware samples into clusters based on the functions called by the malware samples is depicted, according to some embodiments. In various embodiments, method 1300 may be performed, e.g., by system 900 of FIG. 9 to assign a population of malware samples 102 into clusters 112 of related malware samples based on the respective malware code 902 for the samples 102. For example, method 1300 may be performed by a computer system that includes (or has access to) a non-transitory, computer-readable medium having program instructions stored thereon that are executable by the computer system to cause the operations described with reference to FIG. 13. In FIG. 13, method 1300 includes elements 1302-1306. While these elements are shown in a particular order for ease of understanding, other orders may be used. In various embodiments, some of the method elements may be performed concurrently, in parallel by multiple computer systems (e.g., using a large-scale, distributed systems framework, such as Hadoop, Spark, etc.), in a different order than shown, or may be omitted. Additional method elements may also be performed as desired.

At 1302, in the illustrated embodiment, the computer system accesses information (e.g., malware code 902) corresponding to a plurality of malware samples. For example, in some embodiments, the information includes assembly code associated with the plurality of malware samples 102.

At 1304, in the illustrated embodiment, the computer system generates, based on the information, a function call graph for each of the plurality of malware samples. In some embodiments, element 1304 includes, for a given malware sample of the plurality of malware samples, identifying a plurality of function calls included in the information for the given malware sample, assigning a label to each of the plurality of function calls, and generating the function call graph for the given malware sample based on the relationship and the labels.

Note that, in some embodiments, prior to generating the plurality of function call graphs, method 1300 may include determining whether one or more of the malware samples have been packed and, if so, unpacking and decrypting the samples. Additionally, in some embodiments, method 1300 may include disassembling or decompiling the malware samples to generate the malware code (e.g., malware code 902) included in the information. Note that, in some embodiments, such steps may be performed by the entity performing the malware identification or clustering, by a third party, or by both.

At 1306, in the illustrated embodiment, the computer system assigns, based on the function call graphs, each of the plurality of malware samples into one of a plurality of clusters of related malware samples. For example, in some embodiments, the assigning includes performing approximate subgraph-matching operations based on the function call graphs to determine the plurality of clusters of related malware samples.

In some embodiments, method 1300 further includes the computer system generating a plurality of strings based on the function call graphs, where the plurality of strings includes, for each of the malware samples, a respective string specifying the function call graph for a corresponding malware sample. In some such embodiments, a given string, of the plurality of strings, is an adjacency list specifying a call structure of functions called by the corresponding malware sample.

Further, in some embodiments, method 1300 further includes the computer system generating, based on the plurality of strings, sets of statistical properties associated with the plurality of malware samples, where the sets of statistical properties include, for each of the malware samples, a corresponding set of statistical properties. In some such embodiments, for a given malware sample, the corresponding set of statistical properties includes a distribution of function calls included in the function call graph for the given malware sample.

Note that, in some embodiments, method 1300 may further include the computer system analyzing the statistical properties associated with each of the plurality of malware samples and, based on the analyzing, identifying an anomalous sample included in one of the plurality of clusters. For example, as discussed above with reference to malware sample 102X in FIG. 6, after initial clustering operations have been performed, there may be some malware samples 102 that have been assigned to the improper cluster. In various embodiments, method 1300 may include performing additional analysis (e.g., after initial clustering has been performed) to verify and improve the accuracy of the cluster assignments. In various embodiments, this additional processing may be performed by leveraging large-scale, distributed systems frameworks (e.g., Hadoop, Spark, etc.) to run pair-wise comparisons within each cluster 112 to further strengthen the confidence of the cluster assignments.

Referring now to FIG. 14, a flow diagram illustrating an example method 1400 for determining identifying information for a malware sample (e.g., a newly encountered malware sample) is depicted, according to some embodiments. In various embodiments, method 1400 may be performed, e.g., by malware similarity search server 1200 of FIG. 12 to determine identifying information 1214 for a newly encountered malware sample 102. For example, method 1400 may be performed by a server computer system that includes (or has access to) a non-transitory, computer-readable medium having program instructions stored thereon that are executable by the server computer system to cause the operations described with reference to FIG. 14. In FIG. 14, method 1400 includes elements 1402-1412. While these elements are shown in a particular order for ease of understanding, other orders may be used. In various embodiments, some of the method elements may be performed concurrently, in parallel by multiple computer systems (e.g., using a large-scale, distributed systems framework, such as Hadoop, Spark, etc.), in a different order than shown, or may be omitted. Additional method elements may also be performed as desired.

At 1402, in the illustrated embodiment, the server system maintains malware information (e.g., malware information 1212) corresponding to a plurality of malware samples, where, for each of the plurality of malware samples, the malware information includes: a string specifying a function call graph for a corresponding malware sample; and a set of statistical properties associated with the corresponding malware sample. At 1404, in the illustrated embodiment, the server system receives information (specified, for example, in identification request 1202) corresponding to a particular malware sample (e.g., sample 102). For example, in some embodiments, the information includes code (e.g., in an assembly or assembly-style language, a high-level programming language, etc.) corresponding to the particular malware sample.

At 1406, in the illustrated embodiment, the server system, based on the information, generates: a particular string specifying a function call graph (e.g., function call graph 1206) for the particular malware sample; and a particular set of statistical properties (e.g., function call information 1209) associated with the particular malware sample. In some embodiments, generating the particular string includes identifying a plurality of function calls included in the code for the particular malware sample, generating the function call graph for the particular malware sample based on relationships between the plurality of function calls, and generating the particular string based on the function call graph. In some such embodiments, the particular string is indicative of a structure of the function call graph for the particular malware sample. In some embodiments, the particular set of statistical properties includes a distribution of function calls included in the function call graph for the particular malware sample. Further, in some embodiments, the particular string is an adjacency list specifying a call structure of functions called by the particular malware sample.

At 1408, in the illustrated embodiment, the server system executes a query (e.g., query 1210) against the malware information to retrieve malware samples similar to the particular malware sample, where the query specifies one or more of the particular set of statistical properties or other query parameters (e.g., thresholds for similarity scores, latency, etc.). At 1410, in the illustrated embodiment, the server system identifies, based on the query, a subset of malware samples that match the particular malware sample (e.g., by identifying malware samples that match the statistical properties or other query parameters, in some embodiments). Note that, in various embodiments, element 1410 includes identifying those malware samples that match the particular malware sample to at least a threshold degree (e.g., a similarity value of 0.9, in one embodiment). Thus, in various embodiments, the subset of malware samples do not have to be identical to the particular malware sample in order to "match," so long as they satisfy a particular similarity threshold based on the query.

At 1412, in the illustrated embodiment, the server system assigns the particular malware sample and the subset of malware samples into one of a plurality of clusters of related malware samples. In some embodiments, the server system may then send information to the computer system (e.g., client system 1204) specifying that the particular malware sample has been assigned to the one of the malware clusters. Further, this information may also specify a malware classification (e.g., worm, adware, etc.) of the one of the malware clusters to which the particular malware sample has been assigned.

In some embodiments, method 1400 further includes the server system storing the particular string and the particular set of statistical properties as part of the malware information, such that this information may be included in the malware information to aid in the identification and classification of subsequent malware samples. Further, in some embodiments, method 1400 includes receiving subsequent information corresponding to a subsequent malware sample. Based on that information, in some such embodiments, the server system may generate a string specifying a function call graph for the subsequent malware sample, and a set of statistical properties associated with the subsequent malware sample. Further, in such embodiments, the server system may execute a subsequent query against the malware information and, based on this subsequent query, identify a second subset of malware samples (including the particular malware sample) that match the subsequent malware sample.

Note that, in some embodiments, method 1400 may further include the server system analyzing the statistical properties associated with the subset of malware samples to identify at least one anomalous sample included in the subset. In such embodiments, during the assigning of element 1412, this anomalous sample may then be excluded from the subset, according to some embodiments.

Example Computer System

Figure 15:
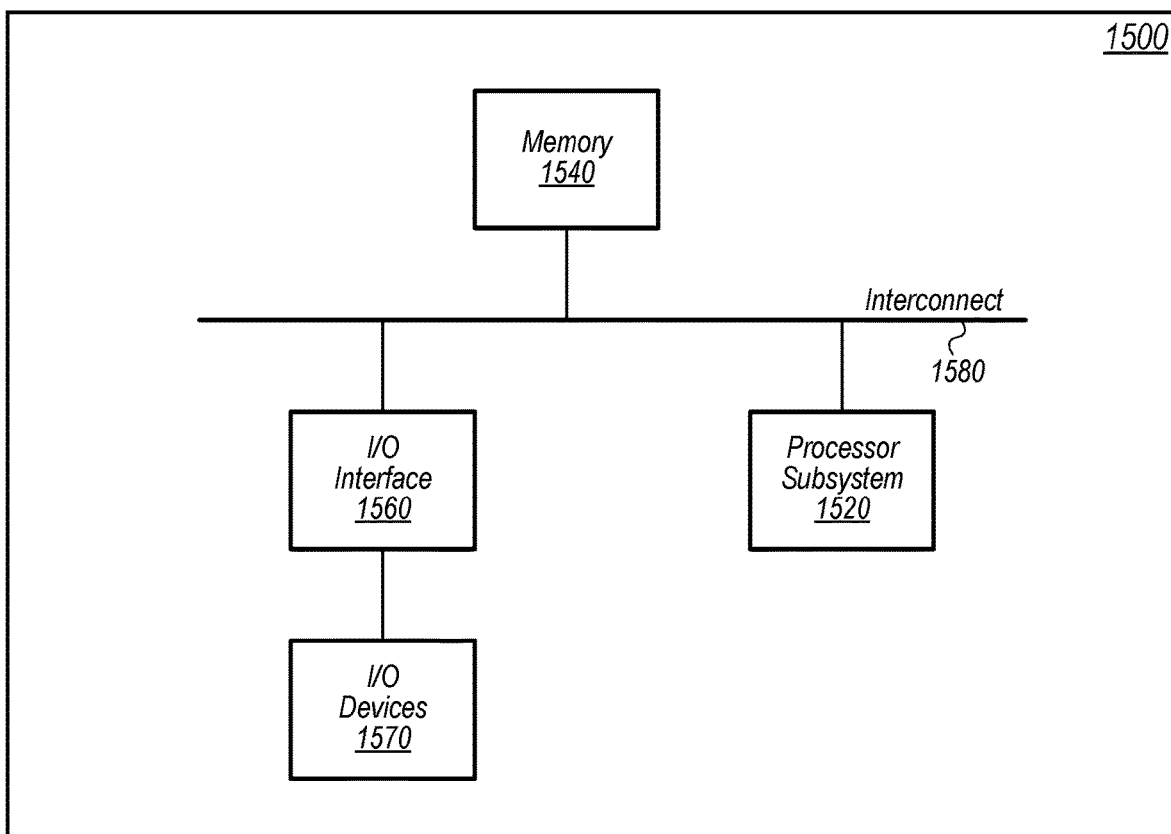
FIG. 15 is a block diagram illustrating an example computer system, according to some embodiments.

Referring now to FIG. 15, a block diagram of an example computer system 1500 is depicted, which may implement one or more computer systems, such as malware similarity search server 1200 of FIG. 12, according to various embodiments. Computer system 1500 includes a processor subsystem 1520 that is coupled to a system memory 1540 and I/O interfaces(s) 1560 via an interconnect 1580 (e.g., a system bus). I/O interface(s) 1560 is coupled to one or more I/O devices 1570. Computer system 1500 may be any of various types of devices, including, but not limited to, a server system, personal computer system, desktop computer, laptop or notebook computer, mainframe computer system, server computer system operating in a datacenter facility, tablet computer, handheld computer, workstation, network computer, etc. Although a single computer system 1500 is shown in FIG. 15 for convenience, computer system 1500 may also be implemented as two or more computer systems operating together.

Processor subsystem 1520 may include one or more processors or processing units. In various embodiments of computer system 1500, multiple instances of processor subsystem 1520 may be coupled to interconnect 1580. In various embodiments, processor subsystem 1520 (or each processor unit within processor subsystem 1520) may contain a cache or other form of on-board memory.

System memory 1540 is usable to store program instructions executable by processor subsystem 1520 to cause system 1500 to perform various operations described herein. System memory 1540 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1500 is not limited to primary storage such as system memory 1540. Rather, computer system 1500 may also include other forms of storage such as cache memory in processor subsystem 1520 and secondary storage on I/O devices 1570 (e.g., a hard drive, storage array, etc.). In some embodiments, these other forms of storage may also store program instructions executable by processor subsystem 1520.

I/O interfaces 1560 may be any of various types of interfaces configured to couple to and communicate with other devices, according to various embodiments. In one embodiment, I/O interface 1560 is a bridge chip (e.g., Southbridge) from a front-side to one or more back-side buses. I/O interfaces 1560 may be coupled to one or more I/O devices 1570 via one or more corresponding buses or other interfaces. Examples of I/O devices 1570 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1570 include a network interface device (e.g., configured to communicate over WiFi, Bluetooth, Ethernet, etc.), and computer system 1500 is coupled to a network via the network interface device.

Although the embodiments disclosed herein are susceptible to various modifications and alternative forms, specific embodiments are shown by way of example in the figures and are described herein in detail. It should be understood, however, that the figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. When used in the claims, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In this disclosure, various "modules" configured to perform designated functions are shown in the figures and described in detail above (e.g., processing 202, comparator 206, cluster determination module 210, shingle generator 402, similarity determination module 502, function call generator 904, etc.). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom verylarge-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
   executing, in a test environment of a computer system, a plurality of malware samples;
   logging, by the computer system, features corresponding to respective execution behaviors of each of the plurality of malware samples to generate a plurality of reports corresponding to the plurality of malware samples, wherein the features corresponding to the respective execution behaviors of each of the plurality of malware samples comprise internal behavioral features associated with execution behaviors of each of the plurality of malware samples that are local to the computer system on which each of the plurality of malware samples is executed and external behavioral features associated with execution behaviors of each of the plurality of malware samples that attempt to communicate with a device that is external to the computer system;
   accessing, by the computer system, malware information that includes the plurality of reports corresponding to the plurality of malware samples;
   processing, by the computer system, the plurality of reports to generate a plurality of vectors that includes, for each of the plurality of malware samples, a corresponding vector indicative of a respective execution behavior of a corresponding malware sample of the plurality of malware samples;
   based on the plurality of vectors, generating, by the computer system, similarity values indicative of a similarity between ones of the plurality of vectors; and
   based on the similarity values, assigning, by the computer system, each of the plurality of malware samples to one of a plurality of clusters of related malware samples.

2. The method of claim 1, wherein processing the plurality of reports comprises:
   accessing a list specifying features usable to differentiate between different categories of malware samples; and
   based on the list, selecting, for each of the plurality of reports, a plurality of features from the features corresponding to the respective execution behaviors of each of the plurality of malware samples to generate a reduced feature set.

3. The method of claim 2, wherein processing the plurality of reports further comprises generating a plurality of strings including a respective string for each of the plurality of reports, wherein each string is indicative of the reduced feature set for a corresponding report of the plurality of reports.

4. The method of claim 3, wherein processing the plurality of reports further comprises generating the plurality of vectors based on the plurality of strings, wherein each of the plurality of vectors includes numerical values indicative of the reduced feature set for the corresponding report of the plurality of reports.

5. The method of claim 4, wherein generating the similarity values comprises based on the plurality of vectors, generating a similarity matrix that specifies a similarity between each pair of the plurality of vectors wherein assigning each of the plurality of malware samples to one of the plurality of clusters of related malware samples is performed based on the similarity matrix.

6. The method of claim 1, wherein processing the plurality of reports comprises:
   based on the malware information, generating a plurality of data shingles that includes, for each of the plurality of reports, a respective set of data shingles;
   generating a plurality of hash values based on the plurality of data shingles, wherein the plurality of hash values include, for each of the plurality of reports, a corresponding hash value that is based on a respective set of data shingles; and
   encoding the plurality of hash values to generate the plurality of vectors.

7. The method of claim 6, further comprising creating, by the computer system, a matrix based on the plurality of vectors, wherein each column of the matrix corresponds to a different one of the plurality of vectors.

8. The method of claim 7, wherein generating the similarity values comprises performing a plurality of MinHash operations based on the plurality of vectors included in the matrix to generate, for each of the plurality of malware samples, a set of MinHash values, wherein assigning each of the plurality of malware samples to one of the plurality of clusters of related malware samples is performed, for a given malware sample of the plurality of malware samples, based on a respective set of MinHash values of the given malware sample of the plurality of malware samples.

9. The method of claim 1, wherein assigning each of the plurality of malware samples to one of the plurality of clusters of related malware samples includes grouping each of the plurality of vectors into one of the plurality of clusters of related malware samples.

10. The method of claim 9, wherein assigning each of the plurality of malware samples to one of the plurality of clusters of related malware samples is performed using locality-sensitive hashing.

11. A non-transitory, computer-readable medium having instructions stored thereon that, when executed by a processor of a computer system, cause the processor to perform operations comprising:

executing, in a test environment of the computer system, a plurality of malware samples;

logging features corresponding to respective execution behaviors of each of the plurality of malware samples to generate a plurality of reports corresponding to the plurality of malware samples, wherein the features corresponding to the respective execution behaviors of each of the plurality of malware samples comprise internal behavioral features associated with execution behaviors of each of the plurality of malware samples that are local to the computer system on which each of the plurality of malware samples is executed and external behavioral features associated with execution behaviors of each of the plurality of malware samples that attempt to communicate with a device that is external to the computer system;

accessing malware information that includes the plurality of reports corresponding to the plurality of malware samples;

processing the plurality of reports to generate a plurality of vectors that includes, for each of the plurality of malware samples, a corresponding vector indicative of a respective execution behavior of a corresponding malware sample of the plurality of malware samples;

based on the plurality of vectors, generating similarity values indicative of a similarity between ones of the plurality of vectors; and based on the similarity values, assigning each of the plurality of malware samples to one of a plurality of clusters of related malware samples.

12. The non-transitory, computer-readable medium of claim 11, wherein the processing the plurality of reports comprises:

accessing a list specifying features usable to differentiate between different categories of malware samples;

based on the list, selecting, for each of the plurality of reports, a plurality of features from the features corresponding to the respective execution behaviors of each of the plurality of malware samples to generate a reduced feature set; and generating a plurality of strings, wherein the plurality of strings include a respective string for each of the plurality of reports, and wherein each string is indicative of the reduced feature set for a corresponding report of the plurality of reports.

13. The non-transitory, computer-readable medium of claim 12, wherein processing the plurality of reports further comprises:

generating the plurality of vectors based on the plurality of strings, wherein each of the plurality of vectors includes numerical values indicative of the reduced feature set for the corresponding report; and based on the plurality of vectors, generating a similarity matrix that specifies a similarity between each pair of the plurality of vectors.

14. The non-transitory, computer-readable medium of claim 11, wherein processing the plurality of reports comprises:

based on the malware information, generating a plurality of data shingles that includes, for each of the plurality of reports, a respective set of data shingles;

generating a plurality of hash values based on the plurality of data shingles, wherein the plurality of hash values include, for each of the plurality of reports, a corresponding hash value that is based on a respective set of data shingles; and encoding the plurality of hash values to generate the plurality of vectors.

15. The non-transitory, computer-readable medium of claim 14, wherein the operations further comprise creating a matrix based on the plurality of vectors, wherein each column of the matrix corresponds to a different one of the plurality of vectors, wherein generating the similarity values includes performing a plurality of MinHash operations based on the plurality of vectors included in the matrix to generate, for each of the plurality of malware samples, a set of MinHash values, and wherein assigning each of the plurality of malware samples to one of the plurality of clusters of related malware samples is performed, for a given malware sample of the plurality of malware samples, based on a respective set of MinHash values of the given malware sample of the plurality of malware samples.

16. A system comprising:

at least one processor; and a non-transitory memory having instructions stored thereon that are executable by the at least one processor to cause the system to perform operations comprising:

executing, in a test environment of the system, a plurality of malware samples, logging features corresponding to respective execution behaviors of each of the plurality of malware samples to generate a plurality of reports corresponding to the plurality of malware samples, wherein the features corresponding to the respective execution behaviors of each of the plurality of malware samples comprise internal behavioral features associated with execution behaviors of each of the plurality of malware samples that are local to the system on which each of the plurality of malware samples is executed and external behavioral features associated with execution behaviors of each of the plurality of malware samples that attempt to communicate with a device that is external to the system, accessing malware information that includes the plurality of reports corresponding to the plurality of malware samples, processing the plurality of reports to generate a plurality of vectors that includes, for each of the plurality of malware samples, a corresponding vector indicative of a respective execution behavior of a corresponding malware sample of the plurality of malware samples;

based on the plurality of vectors, generating similarity values indicative of a similarity between ones of the plurality of vectors, and based on the similarity values, assigning each of the plurality of malware samples to one of a plurality of clusters of related malware samples.

17. The system of claim 16, wherein processing the plurality of reports comprises:

accessing a list specifying features usable to differentiate between different categories of malware samples;

based on the list, selecting, for each of the plurality of reports, a plurality of features from the features corresponding to the respective execution behaviors of each of the plurality of malware samples to generate a reduced feature set; and generating a plurality of strings, wherein the plurality of strings include a respective string for each of the plurality of reports, and wherein each string is indicative of the reduced feature set for a corresponding report of the plurality of reports.

18. The system of claim 17, wherein processing the plurality of reports further comprises:
- generating the plurality of vectors based on the plurality of strings, wherein each of the plurality of vectors includes numerical values indicative of the reduced feature set for the corresponding report of the plurality of reports; and
- based on the plurality of vectors, generating a similarity matrix that specifies a similarity between each pair of the plurality of vectors.

19. The system of claim 16, wherein processing the plurality of reports comprises:
- based on the malware information, generating a plurality of data shingles that includes, for each of the plurality of reports, a respective set of data shingles;
- generating a plurality of hash values based on the plurality of data shingles, wherein the plurality of hash values include, for each of the plurality of reports, a corresponding hash value that is based on a respective set of data shingles; and
- encoding the plurality of hash values to generate the plurality of vectors.

* * * * *